(12) United States Patent
MeLampy et al.

(10) Patent No.: US 8,204,064 B2
(45) Date of Patent: Jun. 19, 2012

(54) METHOD AND SYSTEM OF SESSION MEDIA NEGOTIATION

(75) Inventors: Patrick John MeLampy, Pepperell, MA (US); Robert F. Penfield, Concord, MA (US); Clifford Spencer, Lexington, MA (US); David Michael Gray, Milford, MA (US)

(73) Assignee: Acme Packet, Inc., Bedford, MA (US)

( * ) Notice: Subject to any disclaimer, the term of this patent is extended or adjusted under 35 U.S.C. 154(b) by 913 days.

(21) Appl. No.: 11/521,727

(22) Filed: Sep. 15, 2006

(65) Prior Publication Data

US 2007/0116043 A1 May 24, 2007

Related U.S. Application Data

(60) Provisional application No. 60/718,111, filed on Sep. 16, 2005.

(51) Int. Cl.
*H04L 12/56* (2006.01)
(52) U.S. Cl. ........................................ 370/401
(58) Field of Classification Search ............... 370/401, 370/261, 329, 352, 259, 216, 220, 235
See application file for complete search history.

(56) References Cited

U.S. PATENT DOCUMENTS

| | | | |
|---|---|---|---|
| 6,373,839 B1 | 4/2002 | Clark et al. | |
| 7,460,518 B1 * | 12/2008 | Salama et al. | 370/352 |
| 2004/0095958 A1 | 5/2004 | Ejzak et al. | |
| 2004/0196867 A1 * | 10/2004 | Ejzak et al. | 370/468 |
| 2004/0240399 A1 | 12/2004 | Corrao et al. | |
| 2005/0060411 A1 * | 3/2005 | Coulombe et al. | 709/227 |
| 2006/0285493 A1 * | 12/2006 | Manuja et al. | 370/235 |
| 2007/0242677 A1 * | 10/2007 | Shaheen et al. | 370/395.21 |
| 2007/0299714 A1 * | 12/2007 | Levine et al. | 705/9 |

OTHER PUBLICATIONS

International Search Report and Written Opinion.
U.S. Appl. No. 11/521,700, filed Sep. 15, 2006, entitled "Method and System of Partitioning a Signaling Protocol," inventors, MeLampy, et al.
U.S. Appl. No. 11,522,122, filed Sep. 15, 2006, entitled "Method and System of Providing Redundancy in a Network Device," inventors, Khan, et al.
U.S. Appl. No. 11/521,726, filed Sep. 15, 2006, entitled "Method and System of Providing Redundancy in a Network Device," inventors, Gray, et al.

(Continued)

*Primary Examiner* — Man Phan
*Assistant Examiner* — Nourali Mansoury
(74) *Attorney, Agent, or Firm* — Thomas, Kayden, Horstemeyer & Risley, LLP

(57) ABSTRACT

Methods and systems for processing a signaling message are disclosed. An exemplary method comprises: determining a first transcoding policy associated with an originator endpoint contained in a received first call offer; determining a second transcoding policy associated with an answerer endpoint contained in the first call offer; applying the first transcoding policy to a first offer codec set in the first call offer to produce a second call offer containing a second offer codec set; applying the second transcoding policy to the second codec set to produce a third call offer containing a third offer codec set; comparing a first answerer codec set in a received first answer and a second answerer codec set contained in the second call offer; and determining whether or not to perform transcoding based on a result of the comparison.

13 Claims, 28 Drawing Sheets

OTHER PUBLICATIONS

U.S. Appl. No. 11/521,728, filed Sep. 15, 2006, entitled "Method and System of Routing Media Packets in a Network Device", inventors, Khan, et al.

Hardwick, J. "Session Border Controllers Enabling the VoIP Revolution" Data Connection Limited. Internet citation, Feb. 2005, pp. 1-51, XP002362943.

G. Camarillo, J. Hautakorpi, Ericsson, R. Penfield, Acme Packet, A. Hawrylyshen and Jasomi Networks. "Functionality of Existing Session Border Controller (SBC)" Internet draft, Feb. 2005, XP015037667, ISSN: 0000-0004.

J. Rosenberg. "Requirements for Session Policy for the Session Initialization Protocol (SIP)" Internet draft, Jul. 19, 2004. XP015027965, ISSN: 0000-0004.

Supplementary extended European search report for EP 06 814 818.8.

* cited by examiner

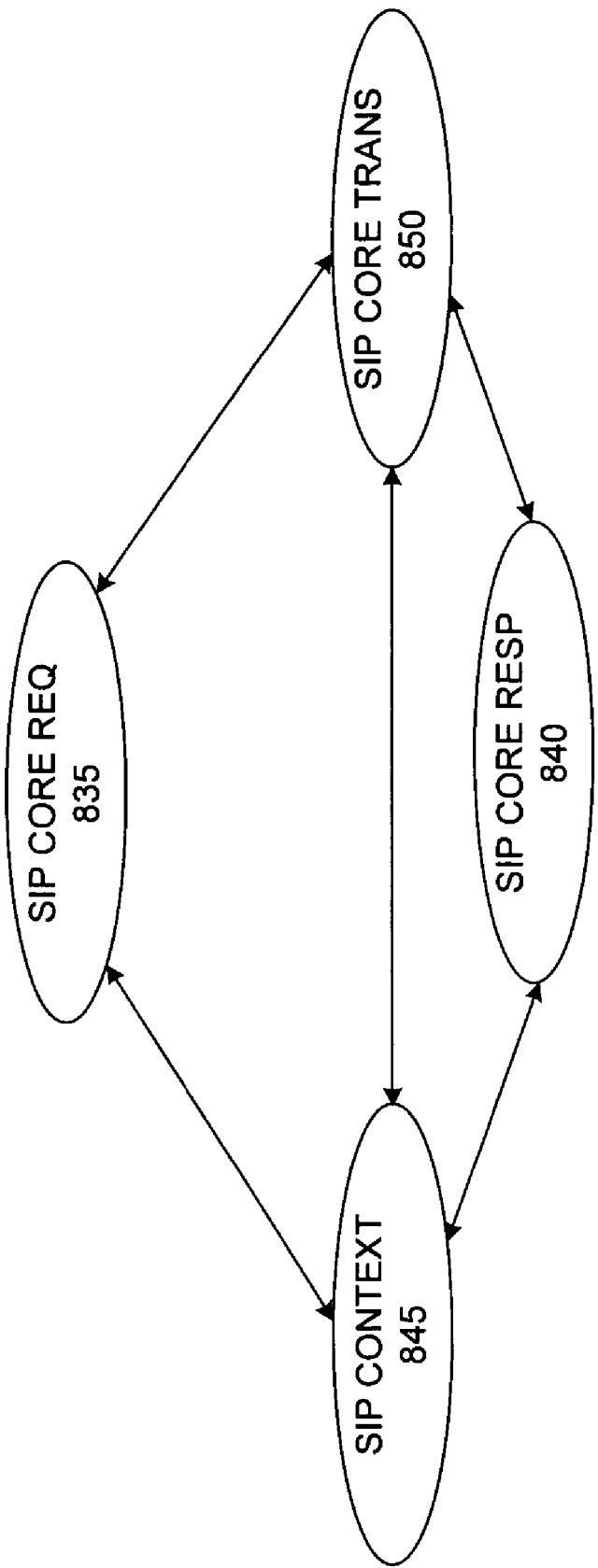

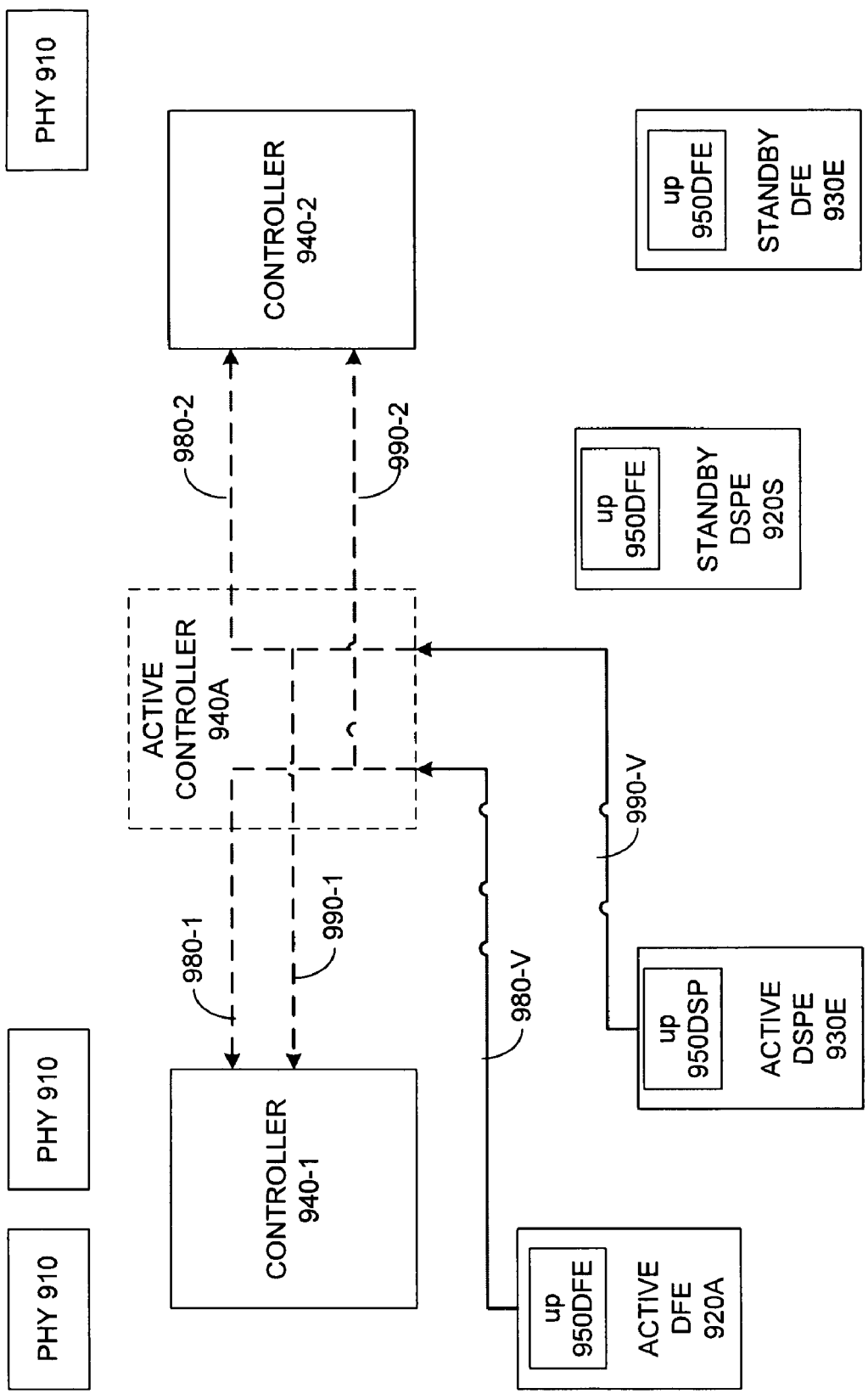

METHOD AND SYSTEM OF SESSION MEDIA NEGOTIATION

CROSS REFERENCE TO RELATED INVENTIONS

This application claims the benefit of U.S. Provisional Application No. 60/718,111, filed Sep. 16, 2005, which is hereby incorporated by reference.

FIELD OF THE INVENTION

The present invention relates to communication networks, and more specifically, to improvements to a session border controller device used in a Voice-over-IP network.

BACKGROUND

FIG. 1 illustrates a network 100 capable of carrying voice, video, and multimedia traffic as well as traditional data. In a preferred embodiment, the network 100 uses the IP protocol as a network layer protocol, and uses a combination of protocols generally known as Voice over IP (VoIP) to carry the voice, video, and/or multimedia traffic over the network layer. Routers 110 forward traffic within network 100. A gateway 120 connects network 100 to the PSTN 130.

A communication endpoint 140 in communication with the network 100 can make and receive calls (voice, video, and/or multimedia) using the facilities of the network 100. A call includes multiple streams of VoIP packets traveling over the network 100: signaling packets to establish (set up), terminate (tear down), modify, and monitor a call; media packets to carry the voice, video, and/or multimedia content; and optional media control packets which carry statistics and timing information related to the call (e.g., jitter, latency, etc.). Various protocols can be used for each of these packet types, although the most common protocols are Session Initiation Protocol (SIP) for signaling packets, Real-time Transport Protocol (RTP) for media packets, and Real-time Transport Control Protocol (RTCP) for media control packets.

A conventional session border controller (SBC) 150 resides at the edge of network 100, and all signaling, media and media control packets for endpoint 140 pass through the SBC 150. SBC 150 provides session routing based on rules and policies, in which multiple signaling routes are examined. Various distribution strategies are used to select a particular signaling destination. SBC 150 also provides media routing so that network routers prioritize call traffic over data traffic. Without media routing and session routing, packets would flow whichever way the underlying network topology would allow, thereby subjecting multi-media data packets to disruptive paths, as well as upstream and downstream failures.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIGS. 8A-C are object diagrams of various SIP processes for FIG. 7.

FIGS. 9A-B are hardware block diagrams illustrating a network device that includes a redundant control plane with inventive features.

DETAILED DESCRIPTION

Figure 1:
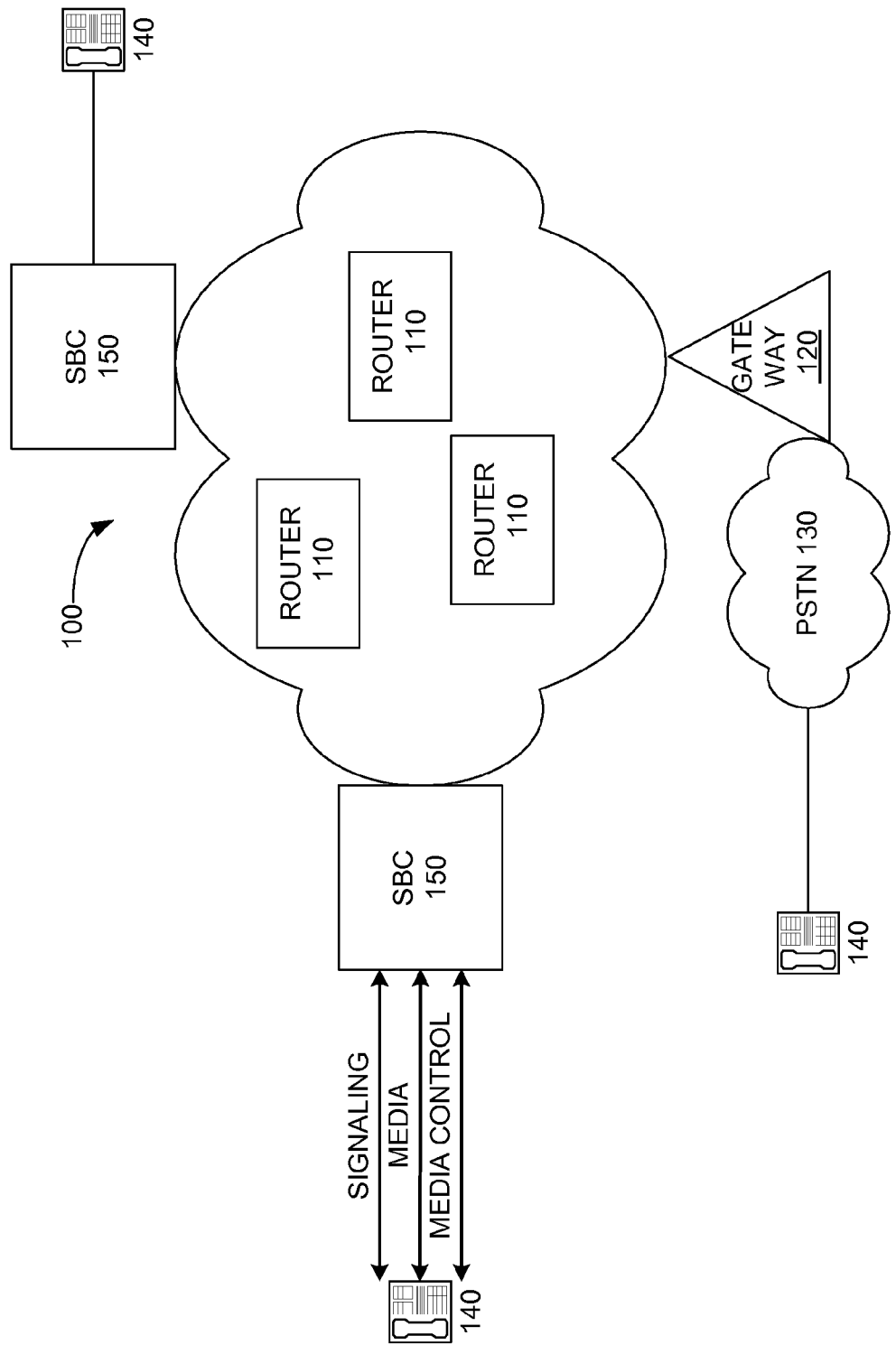
FIG. 1 illustrates a multimedia network capable of carrying voice, video, and multimedia traffic as well as traditional data.
Figure 2:
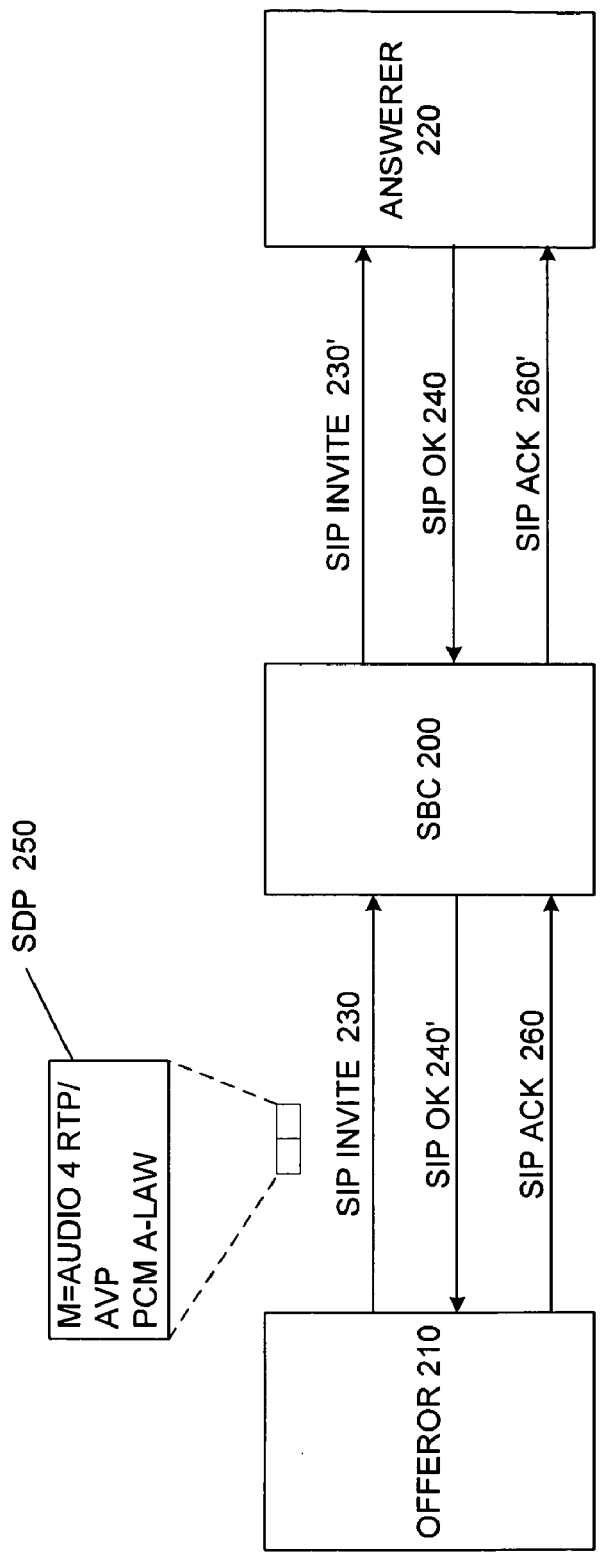
FIG. 2 illustrates the VoIP call setup or establishment process when used with one embodiment of an SBC which includes inventive transcoding features.

FIG. 2 illustrates the VoIP call setup or establishment process when used with one embodiment of an SBC 200 which includes inventive transcoding features. A SIP session occurs between two user agents (UAs), hereinafter referred to as call endpoints. Here, originating endpoint 210 is referred to as the offeror, and the terminating endpoint 220 is referred to as the answerer. A person of ordinary skill in the art should also understand that SIP endpoints are identified by IP addresses and/or ports contained somewhere in the SIP message.

The two endpoints do not communicate directly. Instead, SBC 200 acts as an intermediary between the two endpoints. Specifically, SBC 200 acts as a SIP Back-to-Back User Agent (B2BUA). This intermediate position allows SBC 200 to perform functions such as network address translation (NAT), session and media routing, and transcoding.

A person of ordinary skill in the art should understand that a call between two endpoints is actually made up of two legs, or half-calls: one between the first endpoint and the SBC; and the other between the second endpoint and the SBC. Such a person should also understand that SIP signaling occurs separately from the media flow. Thus, a total of four flows is involved for a single user-to-user call: first endpoint-to-SBC signaling; second endpoint-to-SBC signaling; first endpoint-to-SBC media; and second endpoint-to-SBC media. Finally, a person of ordinary skill in the art should understand that SBC functions such as NAT may result in various fields of the SIP message being changed as the message traverses the SBC. For example, the originator endpoint may be changed (in both the SIP message and the SDP body) to reflect the SBC, rather than the original UA caller, as the originator of the second half-call. The answerer endpoint may be changed in a similar manner to reflect the SBC as the answerer of the first half-call rather than the original UA answerer.

As shown in FIG. 2, the call establishment process begins with the offeror 210 sending a SIP Invite request 230 to SBC 200. As described in more detail below, SBC 200 may modify the contents of the Invite in order to perform transcoding. SBC 200 sends a new Invite message 230', with possibly modified contents, to the answerer 220. Answerer 220 sends one or more responses (positive, negative or provisional) back to the SBC 200. In the example of FIG. 2, answerer 220 sends an OK response 240, which is a final positive response. SBC 200 receives the OK response 240 from answerer 220, and sends a corresponding response (240'), which may be modified, to offeror 210.

In the description that follows, the final (positive or negative) response to a SIP Invite will be called an Answer, and the SIP Invite will be called an Offer. Both Offer 230 and Answer 240 may contain a Session Description Protocol (SDP) portion 250 which describes various features of offeror 210, including a media specification. The media specification in Offer 230 identifies codecs (e.g., PCM A-law, PCM u-law, GSM, G.721, G.729, etc.) that offeror 210 is capable of using during a call. Offeror 210 and answerer 220 use the media specification to negotiate a list of codecs which can be used on a call.

Offer message 230 presents a list of codecs supported by offeror 210. A positive Answer message 240 (OK) from answerer 220 includes at least one of the codecs advertised in Offer 230 that is also supported by Answerer 220. Thus, Answerer 220 can remove unsupported codecs from the list, but cannot add a codec not advertised in the original Offer 230.

The final step in call establishment occurs when offeror 210 accepts the codec list advertised in answer 240. Offeror 210 indicates acceptance by sending an ACK request 260. SBC 200 in turn sends a corresponding ACK request 260 to the other endpoint. At this point the call has been successfully established, and media flow through SBC 200 can begin. During a call, either endpoint can switch among codecs in this negotiated list. But in order to switch to a codec outside of the negotiated list, the endpoints must renegotiate with a second Offer-Answer cycle.

A person of ordinary skill in the art should understand the format of the SIP messages, and the format/content of the SDP media specification. Such a person should understand that the SDP media specification uses RTP payload types rather than codecs, and how payload types are mapped to codecs. For clarity, the term "codec" will be used herein rather than RTP payload type.

Conventional codec negotiation between SIP endpoints was described above. The codec negotiation process taking place through the Offer-Answer cycle remains the same when a conventional B2BUA is interposed between two endpoints. In contrast, SBC 200 described herein takes part in, and may alter, the codec negotiation process by manipulating the media descriptions present in the SDP body of a SIP offer/answer exchange. This inventive feature gives the operator of SBC 200 more control over calls traversing the operator's network. More specifically, this feature provides the mechanism by which media transcoding is configured and enabled for SIP sessions.

SBC 200 uses transcoding policies and/or realms, defined by an administrator for SBC 200, to obtain codec information outside of the signaling process. A SIP endpoint may be associated with a transcoding policy, which define manipulations to be performed on the codec list contained in a SIP Offer/Answer to/from that endpoint.

In some embodiments, a transcoding policy is associated with a realm. A realm is a logical way of identifying a set of SIP call endpoints. The use of realms allows an administrator to create one transcoding policy that applies to multiple SIP endpoints, rather than defining a policy for each endpoint. In one embodiment, a system administrator defines a realm in terms of domains, IP subnetworks, and/or sets of IP addresses. Wildcards can be used to specify more than one address in the set.

When a SIP endpoint is associated with a transcoding policy, either directly or through a realm 310, SBC 200 uses the policy to insure that calls to/from the endpoint adhere to the policy. This process will now be described in connection with FIG. 3.

Figure 3:
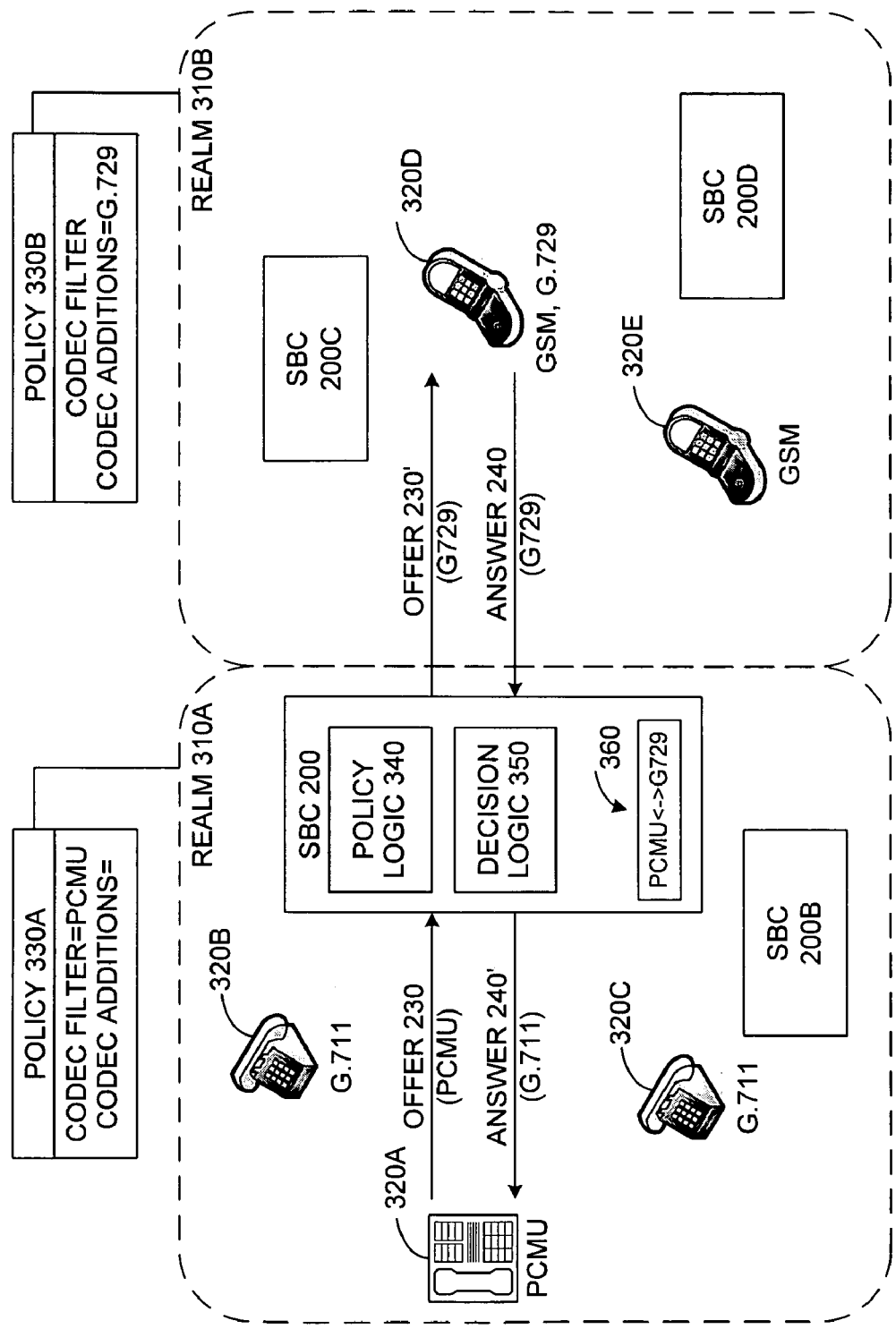
FIG. 3 is a high level diagram of a call scenario in which the SBC of FIG. 2 uses transcoding policies.

FIG. 3 is a high level diagram of a call scenario in which SBC 200 uses transcoding policies. Realm 310A includes SBC 200A and call endpoints 320A-C. Realm 310B includes SBC 200B and call endpoints 320D-E. Realm 310A is associated with transcoding policy 330A. Realm 310B is associated with transcoding policy 330B. A person of ordinary skill in the art should understand that realms 310 may be stored using any mechanism that allows SBC 200 to find, given an endpoint address (e.g., IP address and port), the realm associated with the endpoint.

Transcoding policies 330 are used to specify filtering actions to be performed on the SDP media specifications carried within SIP messages. Policies 330 also allow the insertion of additional media specifications other than those proposed in the original SIP offer coming from an external SIP UA. Furthermore, SBC 200 uses transcoding policies 330 to enforce priority among codecs. When a SIP endpoint is not associated with a policy 330, SBC 200 does not modify the codec list in the SIP Offer/Answer. Similarly, when a SIP endpoint is not associated with a realm 310, SBC 200 does not modify the codec list in the SIP Offer/Answer. A person of ordinary skill in the art should understand that policies 330 may be stored using any mechanism that allows SBC 200 to find, given an endpoint address (e.g., IP address and port) or a realm, the transcoding policy associated with the input.

In the call scenario shown in FIG. 3, original Offer 230 contains a single codec, PCM u-law. On receipt of the original Offer 230, SBC 200 examines the message to determine the Offeror endpoint. SBC 200 then determines whether the Offeror endpoint address is contained in a realm. In this scenario, the Offeror endpoint is 320A, and that endpoint is contained in realm 310A.

SBC 200 inspects the policy (330A) that is associated with the Offeror realm (310A). As discussed below in more detail, logic (340) in SBC 200 applies the associated policy (330A) to the codec list in the original Offer 230. SBC 200 also applies the policy (330B) associated with the Answerer realm (310B) to the codec list. The result of the application of the policies is a modified Offer 230', which SBC 200 sends to the Answerer endpoint 320D. In this scenario, the application of the two policies (330A, 330B) causes the PCM u-law codec to be removed, and the G.729 codec to be added.

The Answerer endpoint (320D) responds with an Answer 240. If Answer 240 is positive, SBC 200 sends an ACK (not shown) to Answerer endpoint 320D, then uses the original Answer 240 and the modified Offer 230' to create a modified Answer 240'. Logic (350) in SBC 200 determines whether or not to perform transcoding. In this scenario, original Answer 240 contains only the G.729 codec, and SBC 200 produces modified Answer 240' which contains only the PCM u-law codec. Therefore, SBC 200 will perform transcoding for the call.

Offeror endpoint 320A accepts the advertised codec list in Answer 240' by sending an ACK (not shown). The call setup has now been completed, and media exchange between codecs can now begin. Media packets flow through SBC 200, and are transcoded (by logic (360) according to the decision described above.

In this embodiment, transcoding is a two-step process: the Offeror's media stream is decoded into raw PCM, and then re-encoded using the codec advertised in the original Answer 240. In other embodiments, direct conversion is available, without passing through raw PCM. A person of ordinary skill in the art should be familiar with transcoding, so no further details will be discussed here.

As described earlier, SBC 200 uses transcoding policies 330 to transform an original Offer 230 into a modified Offer 230'. In one embodiment, SBC 200 applies policies 330 in two stages: in the ingress stage, the Offeror's policy is first applied to original Offer$_1$ to produce Offer$_2$; in the egress stage, the Answerer's policy is next applied to Offer$_2$ to produce Offer$_3$. Thus, a particular policy—e.g., the one associated with realm FOO.COM—may act as either an ingress policy or an egress policy, depending on whether FOO.COM is the realm of the Answerer or the Offeror. (A person of ordinary skill in the art should understand that applying a policy to an offer or answer implies applying a policy to the codec list contained within an offer or answer.)

Note that if there is no policy associated with a stage, the preceding Offer is used as input to the next stage. Thus, when both policies are present, the transformation is Offer$_1$→Offer$_2$→Offer$_3$. When only the Offeror policy is present, the egress stage is skipped, so the transformation is Offer$_1$→Offer$_2$. When only the Answerer policy is present, the ingress stage is skipped, so the transformation is Offer$_1$→Offer$_2$. SBC 200 sends the last Offer produced to the Answerer.

A particular way of defining policies 330, using a specific set of keywords, will now be discussed in more detail. However, a person of ordinary skill in the art should understand that various other implementations of media profiles are possible. Furthermore, the particular user interface used by a system administrator to define media profiles and realms will not be discussed here in detail. A variety of management interfaces, including a command line interface (CLI) and Simple Network Management Protocol (SNMP), can be used to configure media profiles and realms.

This example embodiment of a policy definition supports several keywords and modifiers, as follows. The ALLOW keyword which is followed by a list of codecs. To apply the profile, the profile and incoming Offer are parsed. If an ALLOW'ed codec appears in the codec list of an incoming Offer, SBC 200 copies it to the codec list of an outgoing offer. Conversely, codecs in the incoming Offer which are not on the ALLOW list are not copied to the codec list of the outgoing offer. ALLOW can include a wildcard (e.g., "*") which indicates that any codec is permitted. The following example profile permits only the PCMU and G729 codecs.
ALLOW: PCMU G729

The ALLOW keyword can be used with modifiers. The :No modifier can be used within the ALLOW list to specify exceptions—codecs that are not allowed. These codecs can be understood as being "removed" from the Offer. Specifically, SBC 200 does not copy a ":No" codec appearing in the codec list of an input Offer to the codec list of an outgoing offer. The following example profile permits any codec other than PCMU.
ALLOW: *PCMU:No The :Force modifier can be used within the ALLOW list to force a particular codec, stripping other codecs from the outgoing offer. If the Force'd codec is not found when parsing the incoming offer, the modifier has no effect. That is, if a ":Force" codec is found in the codec list of an input Offer, only the ":Force" codec is copied to the codec list of an outgoing offer. The :Force modifier is respected only for the ingress stage of an offer. The following profile forces G729 when G729 is present in the incoming offer.

```
ALLOW:              PCMU G729:Force
Ingress Offer: PCMU G729
Outgoing Offer: G729              /* PCMU stripped */
Ingress Offer: PCMU
Outgoing Offer: PCMU              /* no G729 in ingress offer*/
```

The :No modifier takes precedence over other modifiers, so that, a codec specification of PCMA:Force:No would result in the removal of PCMA when present.

The ADD keyword is followed by a list of codecs. When the profile is applied, codecs in the ADD list are added to the outgoing offer. ADD'ed codecs are inserted at the front of the list of codecs already in the outgoing offer, in the order listed. No wildcards are permitted. The :ADD keyword is active only for the egress stage of an offer, to avoid adding codecs that cannot be supported locally.

The ORDER keyword specifies a sorting template. Codecs are listed in the preferred order for the outgoing media offer. Matching codecs will be arranged in the SDP media description in the specified order. Any remaining codecs will be subsequently added to the list in their same relative order as in the incoming media offer. A wildcard * anchors the ordering to the start or end of the list. If no wildcard is specified, it is implicitly present at the end of the list to pass through all unspecified codecs in their existing order.

The following example indicates that A B C should be placed at the head of the codec list in the specified order.
ORDER: ABC*

This example indicates that A B C should be placed at the tail of the codec list in the specified order.
ORDER: *A B C This example indicates that A is placed first on the codec list, B C placed at the end of the list, and any other codecs are inserted in between A and B in their current order.
ORDER: A*B C If a codec is specified in the ordering list but not present it is ignored. In the previous example, if A and C were present, but not B, this is handled as A*C.

Now that media profile keywords have been discussed, an exemplary set of realm parameters will now be described. A person of ordinary skill in the art should understand that these realm parameters are merely examples, and that other embodiments may use additional parameters, and/or not use these parameters.

The TRANSCODE-IN-REALM parameter indicates whether transcoding processing should be enabled for sessions where both endpoints reside within a common realm. This parameter is evaluated for simple call flows that traverse two realms. If the answering realm for a call is the same as the originating realm, the associated transcode-in-realm parameter will be checked. In such a case, if the value is disabled or the realm's MM_IN_REALM parameter is disabled, no transcoding will occur. In the case of more complicated call scenarios such as a call going to a call agent and then being reinitiated back to the same realm, TRANSCODE-IN-REALM is not evaluated as two different calls are present.

The TRANSCODE-IN-NETWORK parameter indicates whether transcoding processing should be enabled for sessions where both endpoints reside within a common network (both endpoints are accessed via the same physical port/subport/slot). If TRANSCODE-IN-NETWORK is enabled, it overrides the MM_IN_REALM parameter, effectively setting that parameter to true.

Figure 4:
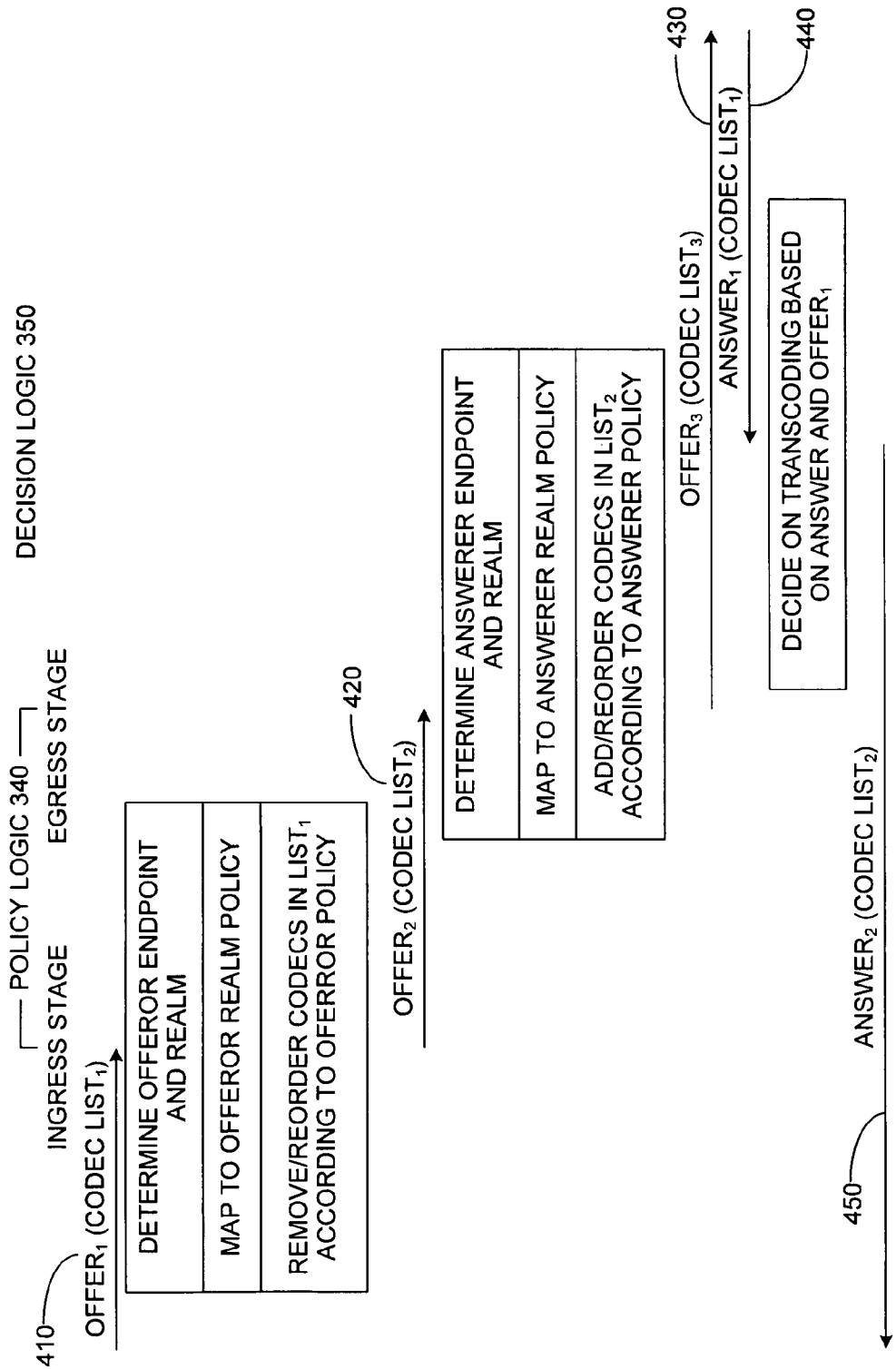
FIG. 4 is a sequence diagram illustrating the process of applying ingress and egress transcoding policies, as performed by policy application logic of FIG. 3.

FIG. 4 is a sequence diagram illustrating the process of applying ingress and egress transcoding policies, as performed by policy application logic 340. SBC 600 receives an original SIP Offer$_1$ (410). SBC 600 examines Offer$_1$ to determine the Offerror endpoint, the Offerror endpoint's realm, and the policy associated with the Offeror's realm. Logic 340 performs the ingress stage of policy application: the rules defined in the ingress (Offeror's) policy are applied to the codec list in Offer$_1$. Codecs are added and removed from the codec list in Offer$_1$ as directed by the ingress policy.

The result of ingress policy application is an intermediate Offer$_2$ (420). Logic 340 then performs the egress stage of policy application: the rules defined in the egress (Answerer's) policy are applied to the codec list in Offer$_2$. The result is a final Offer$_3$ (430) which SBC 600 sends to the Answerer endpoint specified in the original SIP Offer$_1$.

SBC 600 receives an original Answer$_1$ (440). Using the process described below in connection with FIG. 5, logic 350 determines whether or not to perform transcoding and produces a modified Answer$_1$ (450). SBC 200 then sends modified Answer$_1$ to the Offeror endpoint. The Offeror accepts the advertised codec list in Answer$_1$ by sending an ACK (not shown). The call setup has now been completed, and media exchange between codecs can now begin. Media packets flow through SBC 200, and are transcoded as configured earlier by logic 350.

Figure 5:
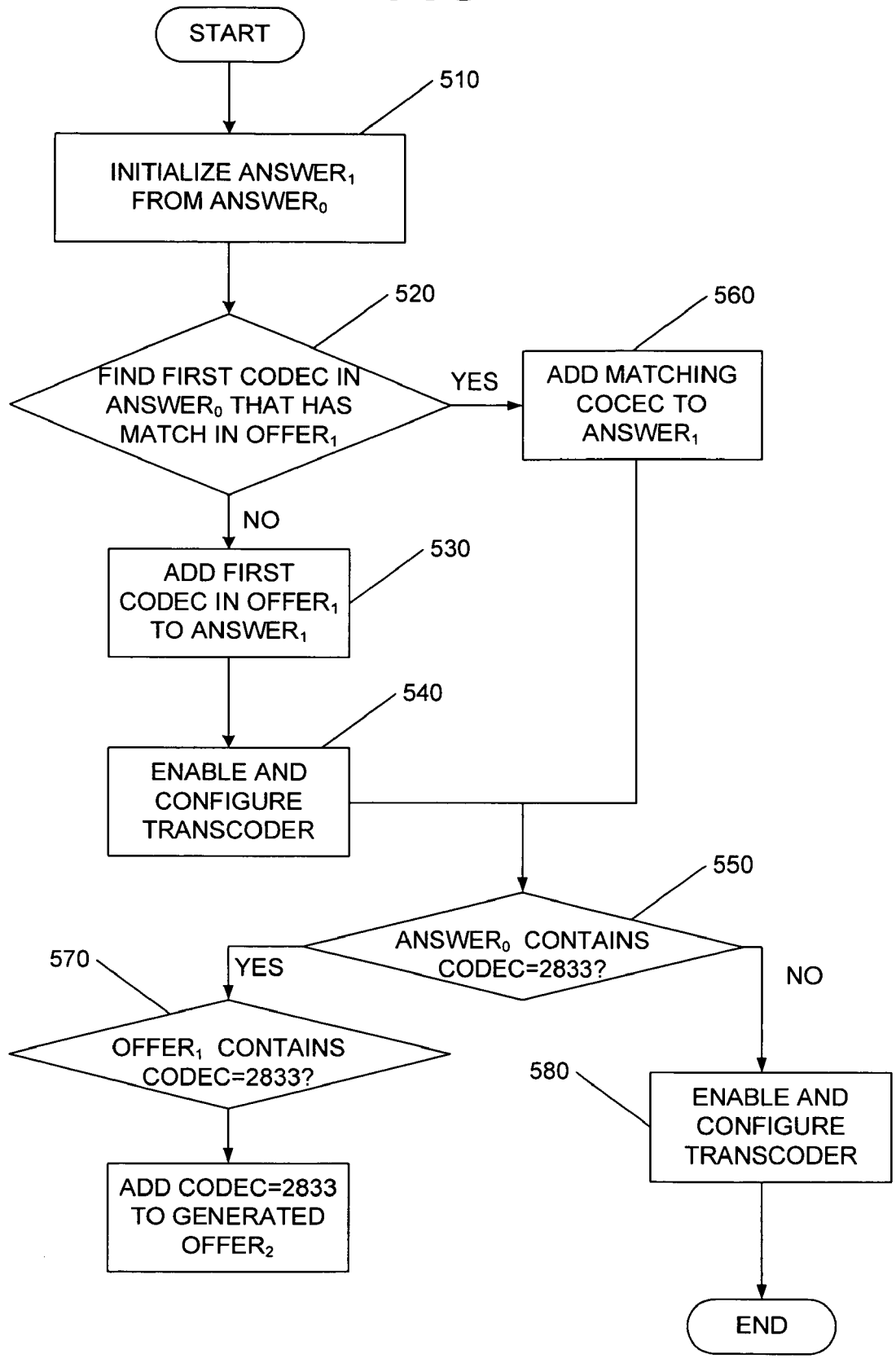
FIG. 5 is a flowchart for processing a received SIP Answer, as performed by policy application logic of FIG. 3.

FIG. 5 is a flowchart for processing a received SIP Answer, as performed by logic 350. Processing starts at block 510, where the Answer$_1$ message is initialized with the contents of received Answer$_0$, but with an empty codec list. At block 520, the logic searches for the first codec in the codec list of Answer$_0$ that has a match in the codec list of previously-sent Offer$_1$.

If no match is found, processing continues at block 530, where the first codec in the codec list of previously-sent Offer$_1$ is added to the codec list of Answer$_1$. Next, at block 540, the transcoder component is informed that transcoding is enabled for this call, and is also informed which codecs will be used on each side of this call, as negotiated by the process described above. Processing then continues at block 550, which will be discussed below.

Returning to block 520, if a matching codec is found between Answer$_0$ and Offer$_1$, processing continues at block 560, where the match is added to the codec list of Answer$_1$. (Note that transcoding is not enabled in this case.) Processing then continues at block 550.

Block 550 determines whether the codec list in Answer$_1$ contains the RFC 2833 codec. If No, processing is finished. If Yes, block 570 then determines whether Offer$_1$ also contains the RFC 2833 codec. If Yes, block 580 adds this codec to the generated Offer$_2$, and processing is finished.

If No, block 590 the transcoder component is informed that transcoding is enabled for this call, and is also informed which codecs will be used on each side of this call. A person of ordinary skill in the art should understand the usage of the RFC 2833 codec, usually with a separate media stream, to transport subscriber line tones and trunk events within RTP packets.

It is not uncommon for an SBC to handle tens of thousands of calls per hour. Therefore, efficient handling of SIP messages an important feature in an SBC. FIGS. 6, 7, and 8A-C illustrate another embodiment of an SBC 600 which includes an inventive software and hardware architecture allowing the device to handle an increased number of SIP transactions per unit time.

Figure 6:
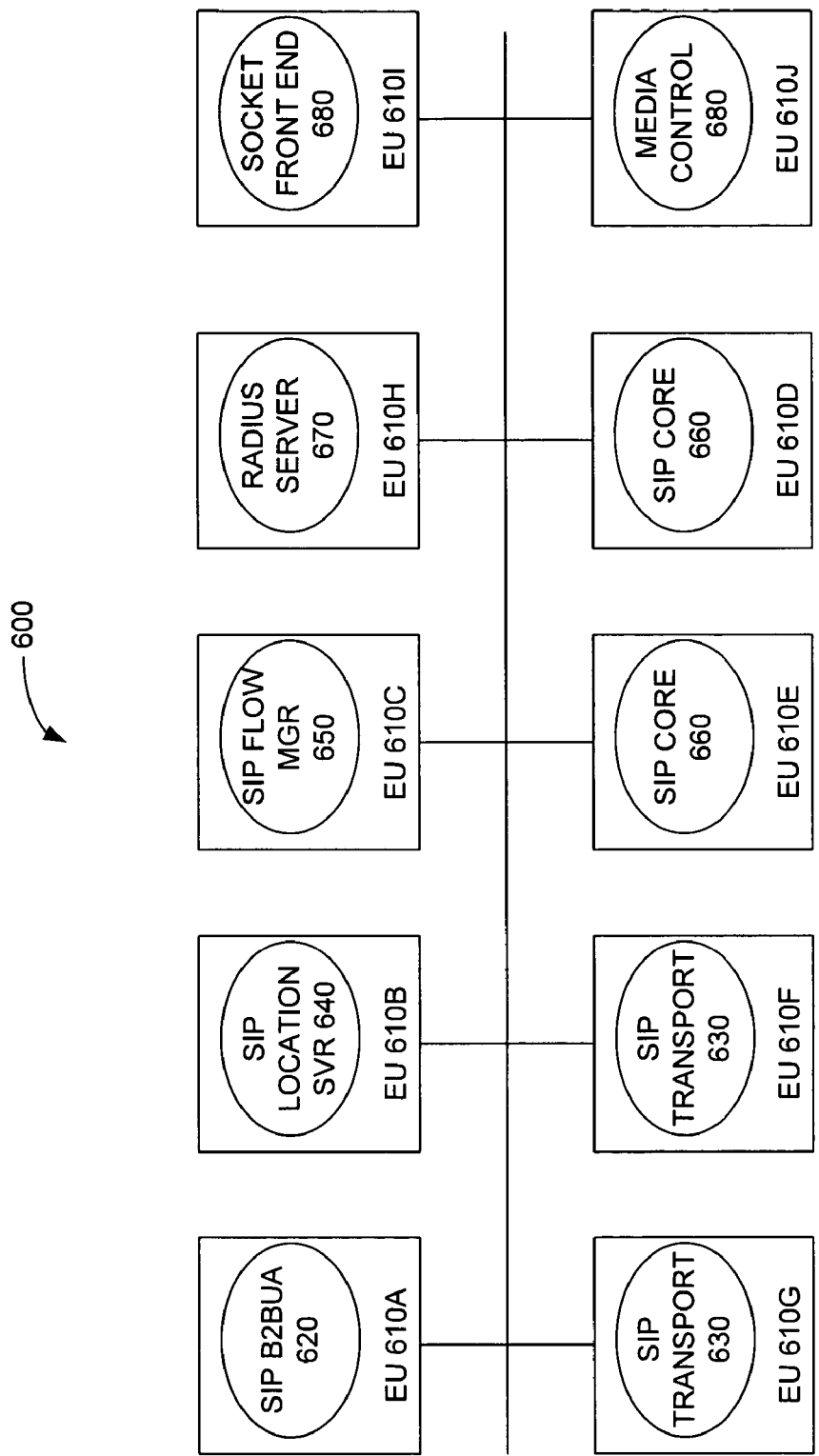
FIG. 6 is a block diagram illustrating how SIP processing is partitioned into discrete processing functions that execute on different execution units.

FIG. 6 is a block diagram illustrating how SIP processing is partitioned into discrete processing functions that execute on different execution units 610A-J. SIP signaling functions include the SIP Back-to-Back User Agent function 620, the SIP Transport function (630), the SIP Location Server function (640), the SIP Flow Manager function (650), and the SIP Core function (660). Advantageously, SIP Back-to-Back User Agent function 620 executes on one execution unit 610A, SIP Location Server 640 executes on another execution unit 610B, SIP Flow Manager 670 executes on yet another execution unit 610C, and SIP Core 660 and SIP Transport 630 execute on other execution units. In this embodiment, SIP Core 660 operates on multiple execution units (610D, E), as does SIP Transport 630 (610F, G). Partitioning of the compute-intensive SIP core is advantageous in increasing call throughput and performance. Using multiple execution units for SIP Transport 630 further improves performance, since ingress SIP Transport and egress SIP Transport are two different pipeline stages.

In another embodiment, SIP Core 660 operates only on one execution unit, one that is different than the execution units running other SIP signaling functions. In yet another embodiment, SIP Transport 630 operates only a single execution unit, one that is different than the execution units running other SIP signaling functions. These SIP signaling functions will be described in more detail in connection with FIG. 7.

SIP processing also utilizes other auxiliary, or utility, functions which are not strictly part of SIP signaling. In the example embodiment of FIG. 6, these auxiliary functions also execute on separate execution units: Radius Server (680) on execution unit 610H; Socket Front End function (690) on execution unit 610I; and Media Controller 690 on execution unit 610J. These auxiliary functions will be described in more detail in connection with FIG. 7.

It will be understood by one of ordinary skill in the art that an "execution unit" may be implemented in a variety of ways, including a single central processing unit (CPU), a processing core within a multiple-core CPU, or a CPU within a multi-processor chip package. In the example embodiment of FIG. 6, SBC 600 includes four general purpose CPUs and a network processor (nP), each with two processing cores for a total of ten processing cores. Execution units 610A-I correspond to nine of the general purpose CPU processing cores while execution unit 610J (running Media Controller 690) corresponds to one of the nP cores. In another embodiment, execution unit 610J (running Media Controller 690) corresponds to one of the general purpose CPU processing cores.

Execution units 610 communicate with each other through any suitable inter-processor communication mechanism. In a preferred embodiment, the execution units 610 are coupled to a switched Ethernet control network (not shown), and the communication mechanism is an in-sequence, reliable message service with a socket interface. Furthermore, in a preferred embodiment, each of the SIP processing functions (630-690) exposes a message-based service interface.

Figure 7:
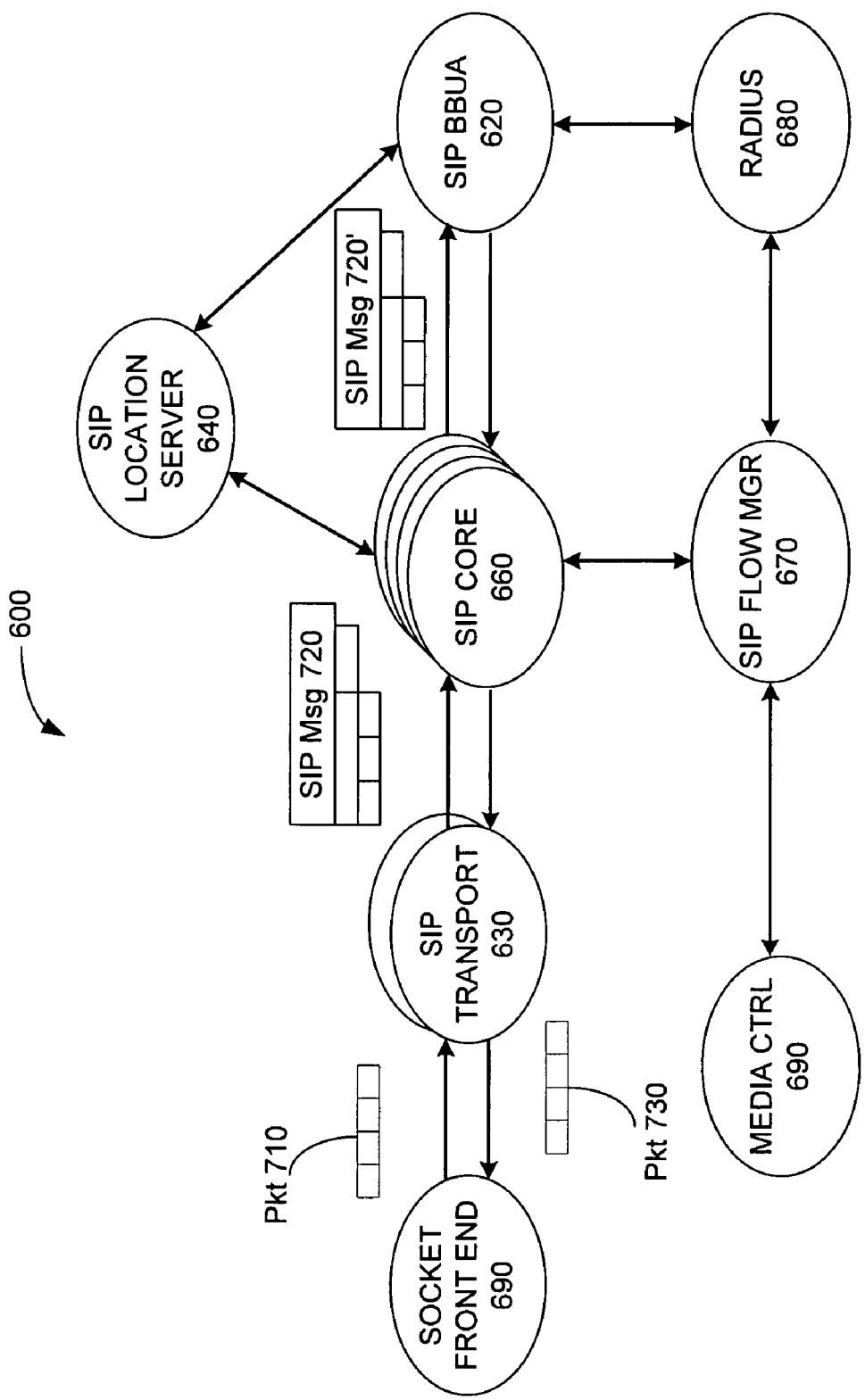
FIG. 7 is a timeline view of the processing of a SIP packet, as it is operated on by various SIP function execution units of FIG. 6.

The rationale for the partitioning shown in FIG. 6 will now be described in connection with FIG. 7. FIG. 7 is a timeline view of the processing of a SIP packet, as it is operated on by various SIP function execution units 610. SIP processing in FIG. 7 can be viewed as a pipeline, where different pipeline stages advantageously execute on different execution units. Since FIG. 7 shows the sequence of operations in a horizontal direction, the partitioning of SIP processing functions shown in FIG. 7 can be also viewed as a "horizontal" partitioning.

SIP processing begins with the receipt of an ingress SIP packet 710 at one of the multiple SIP Transport 630 processes, from Socket Front End 690. SIP Transport 630 implements the Transport Layer as defined by the SIP protocol, and performs SIP-NAT encoding and decoding. SIP Transport 630 first parses and validates the ingress SIP packet 710, transforming ingress SIP packet 710 into a SIP_Msg structure 720. If the SBC 600 performs NAT, then SIP Transport 630 also translates IP addresses and ports in ingress SIP packet 710 as needed. SIP Transport 630 delivers SIP Msg 720 to one of the multiple SIP Core 660 processes.

SIP Core 660 implements the SIP Proxy function, as defined by the SIP protocol, and is responsible for forwarding requests to one or more next hop target destinations. To learn these next hop target destinations, SIP Core 660 forwards SIP Msg 720 to SIP Location Server 640 or to SIP Back-to-Back User Agent function 620, obtains a list of routes from that function, and updates SIP Msg 720 with that list. SIP Core 660 calls into SIP Flow Manager 670 if SIP Msg 720 is a SIP Request containing a session description (SDP). SIP Msg 720 makes a return trip through the pipeline to SIP Transport 630. SIP Transport 630 transforms SIP Msg 720 into an egress SIP packet 730, which is delivered to Socket Front End 690 for transmission outside the SBC 600.

The partitioning of SIP processing functions shown in FIG. 7 can be also viewed as a "vertical" partitioning. SIP Core 660, running on one execution unit 610, uses non-SIP functions that execute on different execution units 610. Radius Server 680 is used to bill calls (authorization, authentication, and accounting). SIP Core 660 calls into the Radius Server 680 with user accounting information derived from the SIP session, and Radius Server 680 returns with an accounting response when the server has processed the accounting request. SIP Flow Manager 670 uses Media Controller 690 to manage configuration of a Data Forwarding Element (DFE) so that media packets are delivered to the appropriate DFE based on flow identifier.

In the example embodiment of FIG. 7, the packets exchanged between SIP Transport 630 and Socket Front End 690 are encapsulated IP packets pre-pended with a proprietary header that includes ingress and egress interface information, as well as the "socket handle" generated by the SFE to identifying the associated socket. In one embodiment, SIP Transport 630 uses "virtual" socket objects to represent each SFE socket instance.

The inventive architecture described above includes both vertical and horizontal partitioning of tasks. Partitioning in this manner increases the number of SIP messages that can be processed per unit time. The SIP processing functions shown in FIG. 7 will now be described in more detail in FIGS. 8A-C.

Figure 8A:
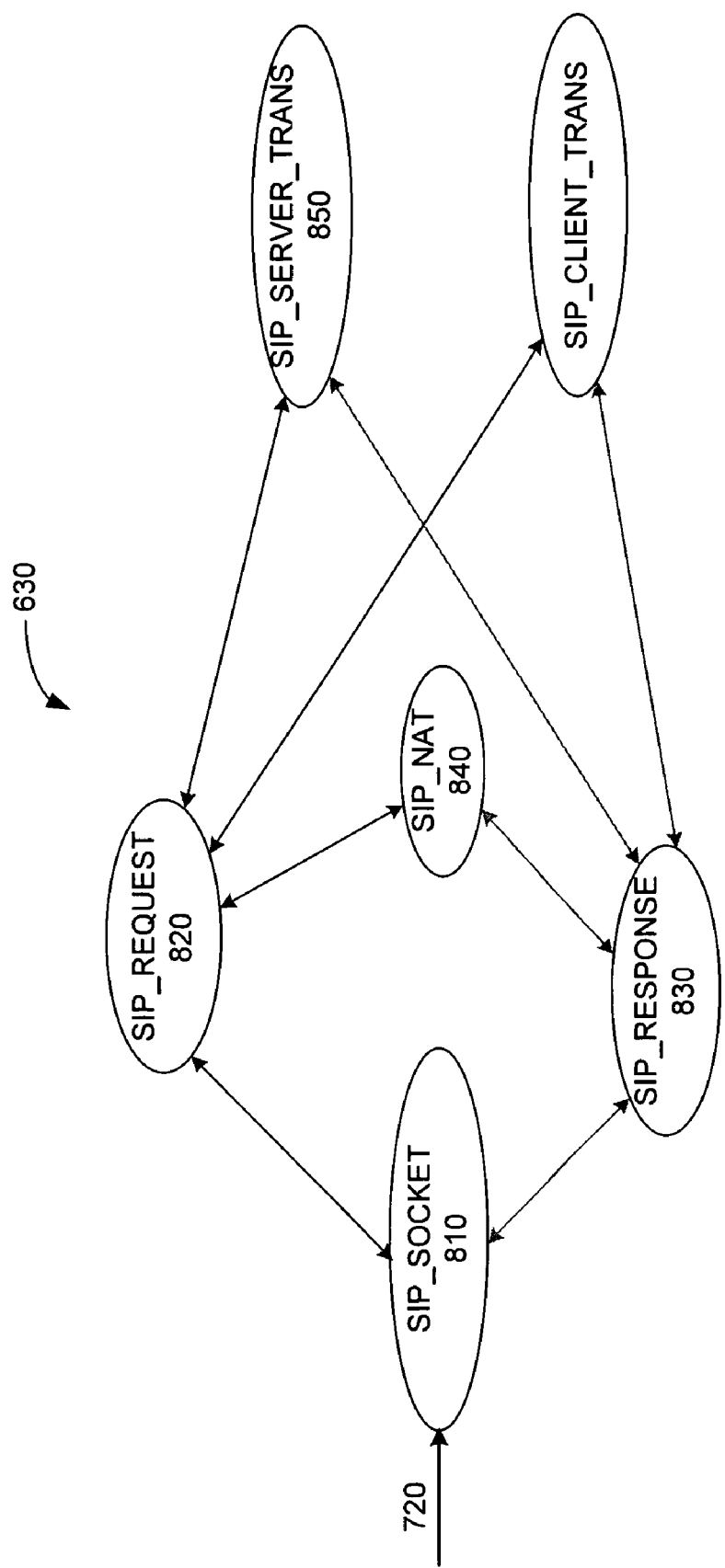

FIG. 8A is an object diagram of SIP Transport 630 of FIG. 7. An incoming SIP Message 720 is received by a SipSocket object (810), and is transformed into a Request object (815) or a Response object (820) based on the contents of SIP Msg 720. Next, NAT encoding (825) is performed on Request 815/Response 820.

When a Request 815 is received, a Server Transaction object (825) is used to match against the Server Transaction Table (using standard transaction matching as defined in SIP RFC 3261). When a matching Server Transaction 825 is found, the latest response for the matched Server Transaction 825 is sent via Socket Front End 690. If there is no response from Server Transaction 825, SIP Transport 630 drops the incoming message since the SIP Transaction Layer takes care of all retransmissions. If a matching Server Transaction 825 is not found, a new one is created and assigned to a SIP Core execution unit.

Execution units for SIP Core 660 are assigned through a load balancing scheme that considers the number of outstanding transactions per SIP Core process in determining next available. Request 815 is then delivered to the processor core running the associated instance of the SIP Core process 660.

When a Response 820 is received, a Client Transaction object 830 is used to match against the Client Transaction Table. When a matching Client Transaction 830 is found, Response 820 is sent to the SIP Core 660 assigned to the earlier associated Request 815 in the Client Transaction 830.

Outgoing responses for Server Transaction 825 whether generated internally or from a Client Transaction 830, are received from SIP Core 660. The outgoing Response 820 is stored in the Server Transaction 825 and transmitted to the previous hop via Socket Front End 690.

FIG. 8B is an object diagram of the SIP Core 660 of FIG. 7. SIP Core 660 implements the SIP Proxy function and is responsible for forwarding requests to one or more next hop target destinations learned through SIP Location Server 640 or SIP Back-to-Back User Agent function 620. SIP Core 660 first determines if the message is a SIP Request or a SIP Response, creates either a Core Request object (835) or a Core Response object (840) as appropriate, then operates as follows.

For a Core Request 835, SIP Core 660 creates a Sip Context object (845) which corresponds to the Server Transaction object 825 in SIP Transport 630. The Response Context 845 is used to gather all responses from the next hop targets that the Core Request 835 is forwarded to, and to determine the appropriate response for sending back to the previous hop.

Returning briefly to FIG. 7, SIP Core 660 determines next hop targets by routing the message on to SIP Location Server 640 or SIP Back-to-Back User Agent function 620. A Core Request 835 within an existing dialog is sent to SIP Back-to-Back User Agent function 620. A request Core Request 835 is considered to be within a dialog if the tag header parameter exists in the To header field of the Core Request 835. A Core Request 835 which does not have a To tag is sent to SIP Location Server 640. Once the set of next hop targets is determined, the Core Request 835 is sent back to SIP Core 660.

Returning again to FIG. 8B, SIP Core 660 then creates a Sip Core Transaction object (850), which corresponds to the Client Transaction object 830 in SIP Transport 630, to forward Core Request 835 to a particular next hop. When the SBC is acting as a B2BUA, each next hop in the target list is tried serially. When a given next hop fails to respond or sends certain error responses, SIP Core 660 tries the next target in the list until one succeeds or all fail. A new Core Transaction 850 is created for each target as it is attempted.

Returning briefly to FIG. 7, before the outgoing Core Request 835 can be sent to the next hop, the Core Request 835 may be sent through SIP Back-to-Back User Agent function 620 and SIP Flow Manager 670 to create or update session, dialog, and media state. A unique client identifier is assigned to each Core Transaction 850 and passed along with in message to SIP Back-to-Back User Agent function 620 or SIP Flow Manager 670. This client identifier is used to locate the appropriate Core Transaction 850 when a response is received.

Returning again to FIG. 8B, an incoming Core Response 840 is handled as follows. The client identifier is used to locate the SIP Transport 630 that Core Response 840 is associated with. Core Response 840 is passed to the Context 845 to determine if it is an appropriate candidate for the response to a Server Transaction 825.

Returning again to FIG. 8B, depending on the type of message, SIP Core 660 may forward Core Response 840 to SIP Location Server 640 or SIP Back-to-Back User Agent function 620. Responses to in-dialog or dialog-establishing requests will be sent to SIP Back-to-Back User Agent function 620 to create or update dialog state. Responses sent to SIP Back-to-Back User Agent function 620 which contain a session description protocol (SDP) body will be sent to SIP Flow Manager 670 by SIP Back-to-Back User Agent function 620. Response to SIP Register requests that affect the registration cache are sent to SIP Location Server 640. Other responses will be sent to SIP Transport 630 for transmission to the previous hop SIP element.

When processing of Core Response 840 by SIP Location Server 640, SIP Back-to-Back User Agent function 620, or SIP Flow Manager 670 is complete, Core Response 840 is returned to SIP Core 660. The associated Response Context 845 is updated, and Core Response 840 is sent to SIP Transport 630 for transmission to the previous hop SIP element.

Figure 8C:
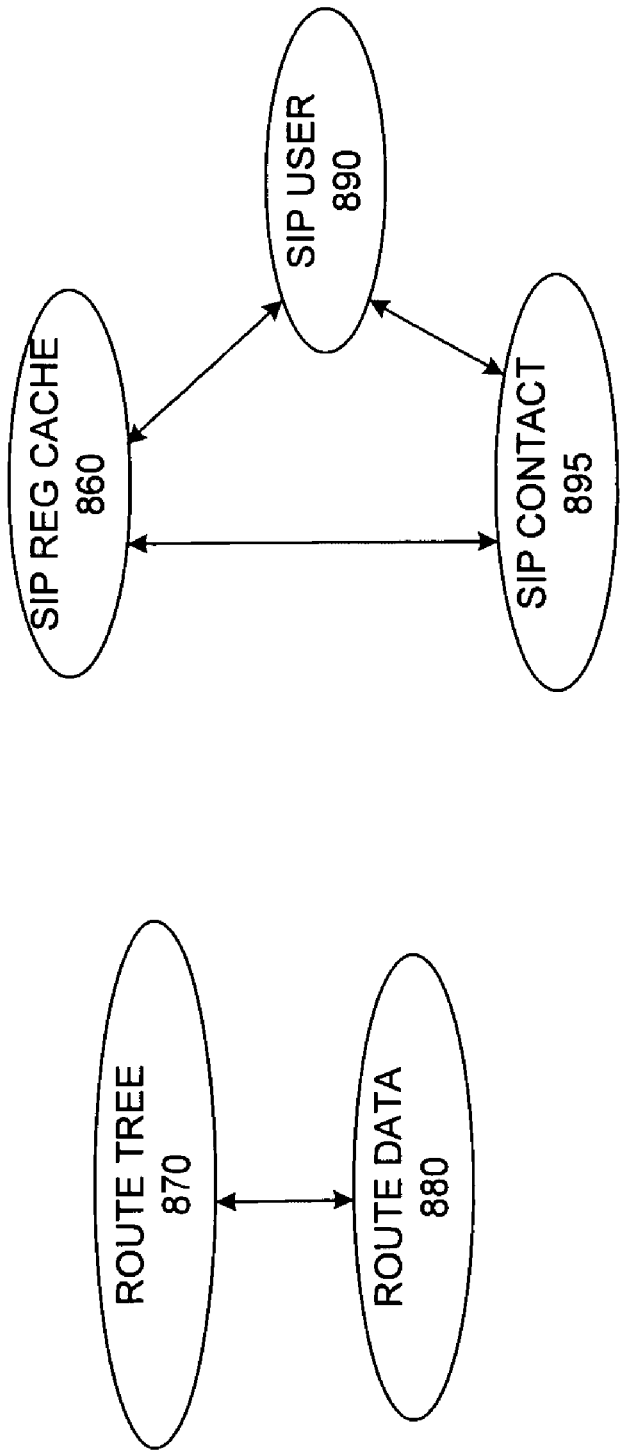

FIG. 8C is an object diagram of the SIP Location Server 640 of FIG. 7. SIP Location Server 640 performs all Local Policy lookups and manages the SIP Registration cache (860). For registration caching and Hosted NAT Traversal, SIP Location Server 640 updates the registration cache 860 for SIP Register requests and responses. When a Register response can be directly generated from the SBC, the SIP Response is passed back to SIP Core 660. For non-Register requests, the request is matched against cache 860 to determine the list of targets/routes the request needs to be forwarded to. When no match is found in the cache 860 (or it is not enabled), and for the cases where the request needs to be forwarded on to the real registrar (i.e. the route-to-registrar option applies), a Local Policy lookup (using the RouteTree object 870) is performed to get a list of targets/routes (Route Data 880). For dialog establishing requests (SIP Invite, and SIP Subscribe), the request is forwarded, using a SIP User object (890), to SIP Back-to-Back User Agent function 620. Other requests are sent back to SIP Core 660.

When a SIP Register request for a cache entry is forwarded to the real registrar (using a SIP Contact object 895), the response will be sent to SIP Location Server 640 by SIP Core 660. SIP Location Server 640 updates the cache entry in cache 860 and constructs the response to be sent back to the endpoint before passing it back to SIP Core 660.

Returning finally to FIG. 7, the result of processing by SIP Core 660 (and possibly SIP Location Server 640) is a new or updated SIP Msg 720', which is delivered to SIP Transport 630 at the next stage of pipeline processing. On the egress side, SIP Transport 630 transforms SIP Msg 720' into an egress SIP packet 710' SIP_Msg structure 740. If SBC 600 performs NAT, then on egress SIP Transport 630 also translates IP addresses and ports in egress SIP packet 710' as needed.

The following sections describe additional embodiments of an improved SBC with inventive features that are equally applicable to other types of network devices, sometimes called "network appliances." Therefore, the general term "network device" will be used rather than SBC.

FIGS. 9-19 illustrate several inventive forms of redundancy in the control and/or data forwarding plane.

Figure 9A:
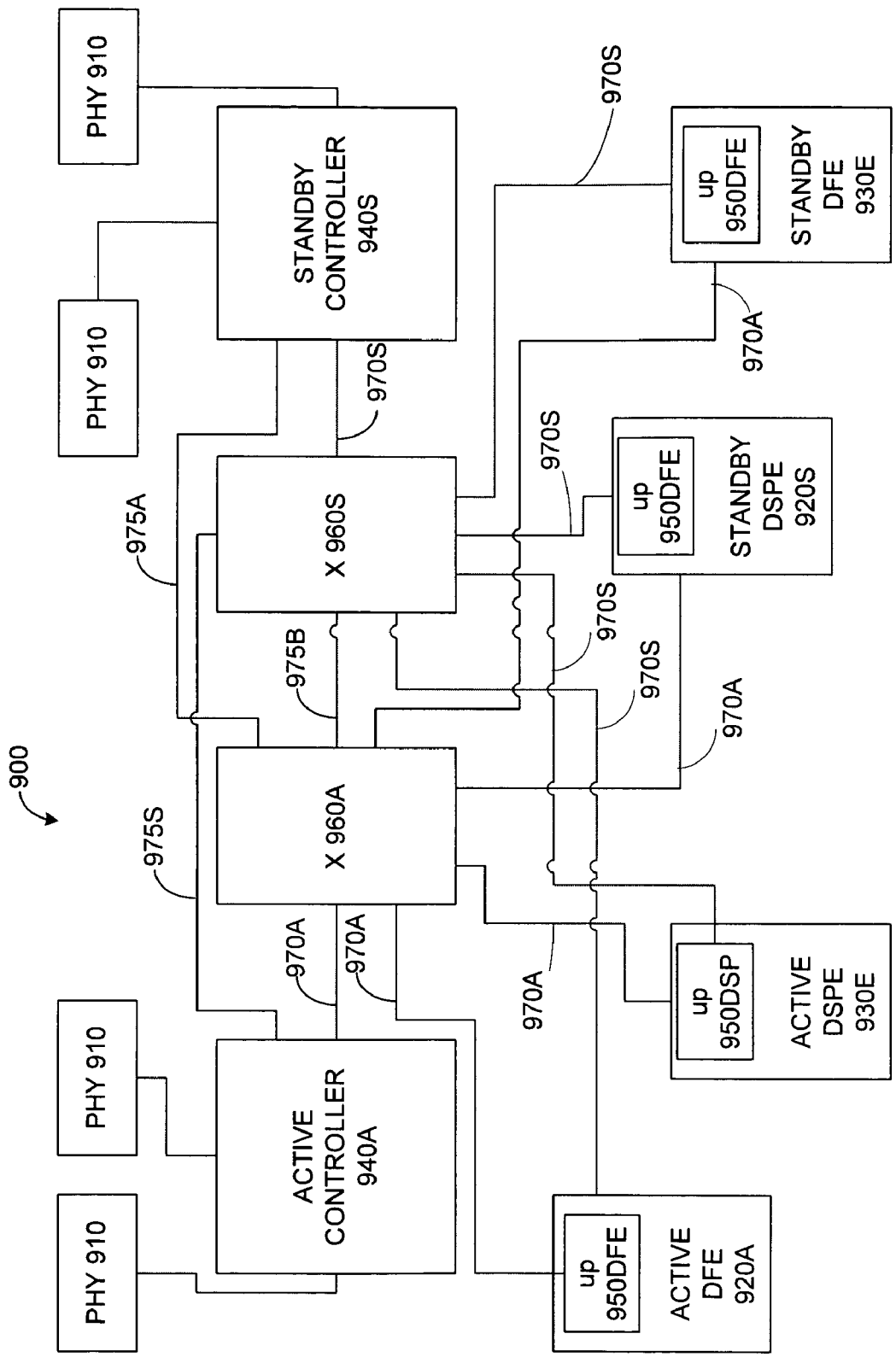
Figure 10:
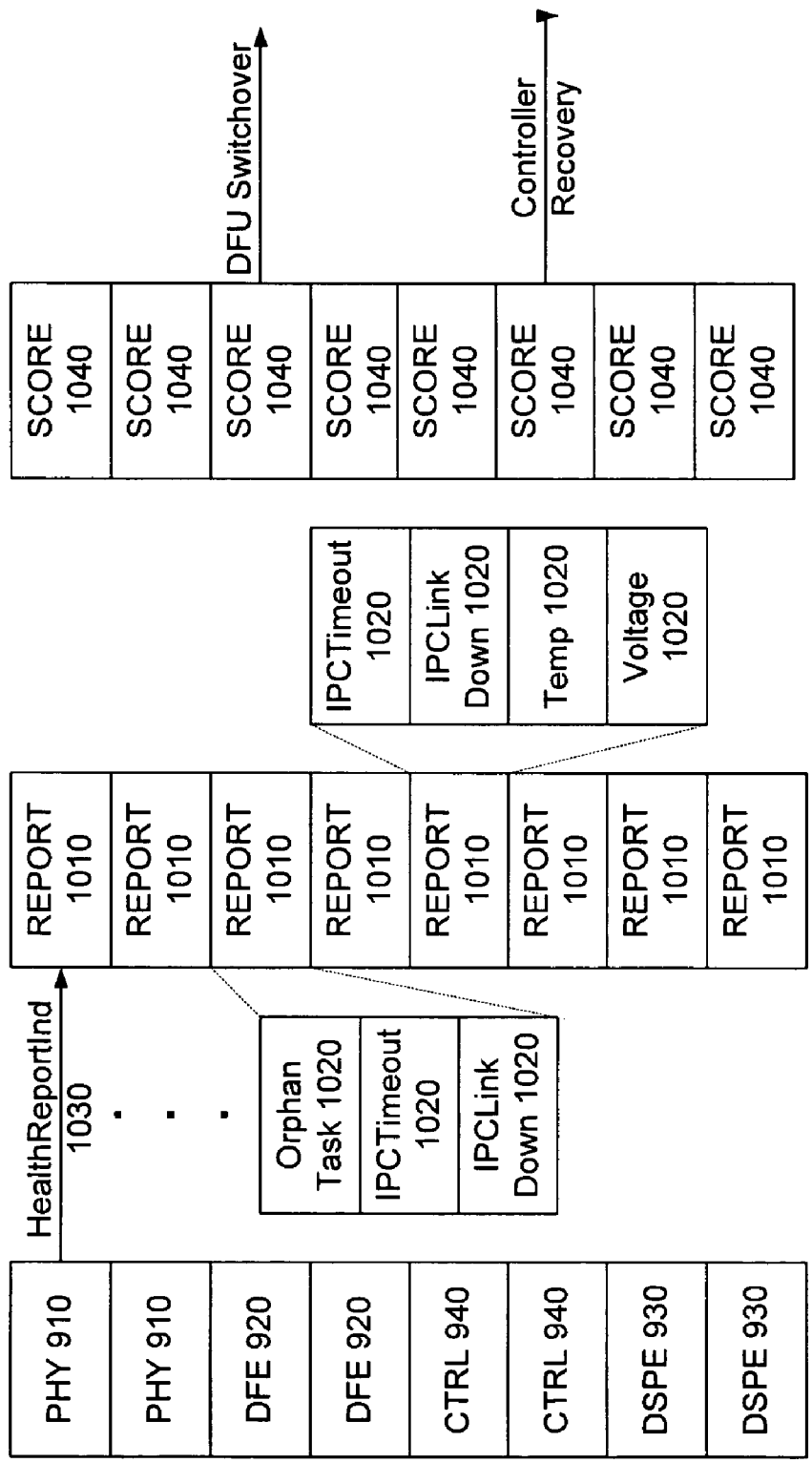
FIG. 10 illustrates one exemplary process of making a controller switchover decision.

FIG. 9A is a hardware block diagram illustrating a network device 900 that includes a redundant control plane with inventive features. Network device 900 contains some of the same components as a conventional network device: ingress and egress network interfaces, also called PHYs (910); a data forwarding element (DFE) 920; and a digital signal processing element (DSPE) 930. A person of ordinary skill in the art should be familiar with data plane processing, in which packets are received into network device 900 from an ingress PHY 910, are examined by DFE 920, possibly processed by DSPE 930, and forwarded on to an egress PHY for transmission out of network device 900. Each of these elements in the data plane is typically implemented as a printed circuit board (PCB), or card, where each card includes multiple components.

A control processor 940 directs the operations of the data plane by communicating with controllers 950 residing on the various cards in the data plane. That is, control processor 940 communicates with controllers 950, and controllers 950 in turn configure components on their respective cards. For example, controller 950DFE on DFE 920 may add and delete CAM entries, or inform a packet classifier of the size and location of packet header fields. As another example, controller 950DSPE may instruct a DSP on DSPE 930 to use a specific coding algorithm for transcoding.

Control processor 940 and controllers 950, which make up the control plane, are typically implemented in a microprocessor, for example, a general-purpose microprocessor or a microcontroller. However, other embodiments may implement this functionality through, for example, a programmable logic device (PLD), programmable gate array (PGA) or an application-specific integrated circuit (ASIC).

In the example embodiment of FIG. 9A, control processors 940 communicate with the PHYs 910 over a separate control bus, for example, an I2C bus. One control bus 995A couples active control processor 940A to each of PHYs 910. Standby control processor 940S is coupled to each of PHYs 910 by control bus 995S. In this manner, a redundant control path to the PHYs 910 is provided. Other forms of communication between control processors 940 and PHYs 910 are also contemplated, for example, a parallel bus, or a switch fabric. Control plane traffic to PHYs 910 normally flows over control bus 995A, but on a controller switchover, the control plane traffic to PHYs 910 flows over control bus 995S.

In the network device 900 of FIG. 9A, each of the above components is made redundant by the inclusion of at least one additional component of the same type. At any one time, only one component in the set of redundant components is active in the data plane, while the remaining components in the set are on standby. A standby component can assume the role of the active component in a process known as switchover. The conditions leading to a component switchover will be described in more detail later with reference to FIG. 10.

Network device 900 of FIG. 9A is a fully redundant configuration, including: active control processor 940A; standby control processor 940S; active DFE 920A; standby DFE 920S; active DSPE 930A; and standby DSPE 930S. A person of ordinary skill in the art should understand that the principles described herein allow further combinations of redundant components, for example, redundant control processors only, redundant DFEs and DSPEs, etc. Although the embodiment of FIG. 9 uses 1+1 redundancy (one standby for one active), such a person should also understand that N+1 redundancy (one standby for N active) is also contemplated.

The inventive redundant control plane shown in FIG. 9 includes multiple control networks with multiple paths of communication between all processors in network device 900. With this design, which will now be described, a single point of failure cannot create an uncrossable bridge in the control plane.

Control processors 940 and controllers 950 are layer-2 endpoints, each with its own layer-2, or Media Access Control (MAC), address. This allows logical channels between control processors 940 and controllers 950 to be implemented by a layer-2 switch 960 which efficiently switches an incoming packet from one layer-2 endpoint (the source) to another layer-2 endpoint (the destination), based on the destination MAC address.

Each of control processors 940 is associated with a different layer-2 switch 960. Each component in the data forwarding plane is coupled to both active control processor 940A (via links 970A on layer-2 switch 960A) and to standby control processor 940S (via links 970S on layer-2 switch 960S). Thus, active control processor 940A has a control channel to each of control processors 940 through layer-2 switch 960A.

Furthermore, active control processor 940A programs layer-2 switch 960A in a full-mesh configuration, so that any endpoint coupled to layer-2 switch 960A can communicate with any other endpoint of layer-2 switch 960A. Similarly, standby control processor 940S programs layer-2 switch 960S in a full-mesh configuration. Thus, standby control processor 940S has a control channel to each of control processors 940 through layer-2 switch 960S. Finally, links 975A,S couple each control processor 940 to the switch 960 associated with the other controller, and link 975B couples the two switches 960.

This configuration provides redundancy in the control plane through two separate and independent layer-2 networks. Upon power-up, Control plane traffic normally flows between active control processor 940A and controllers 950 over links 970A. However, standby control processor 940S can assume the role of the active controller in a process known as controller switchover. After controller switchover, controller 940S (formerly in standby) is active, and communicates with controllers 950 to configure operation of elements in the data plane. In this mode, control plane traffic flows through links 970S on layer-2 switch 960S. The process by which the communication paths are reconfigured will be described in more detail in connection with FIG. 11.

In normal operation, most software executing on the various processors within network device 900 communicates with the active control processor rather than the standby processor. (An exception is the various health reports and redundancy information that is communicated to the standby processor.) Network device 900 includes another inventive feature, in which software executing on the various processors can communicate over a virtual channel to whichever control processor 940 is currently in the active role, without being aware of which control processor 940 is active. Without such a mechanism, software would have to check which control processor 940 is active at any one time in order to address the intended control processor recipient.

FIG. 9B is a hardware block diagram of network device 900 illustrating these virtual channels. The two actual control processors are shown as 940-1 and 940-2. In this diagram, active control processor 940A is illustrated with dashed lines, indicating an abstraction rather than an actual hardware component. A person of ordinary skill in the art should understand how the virtual channel concept is extended to include communication between other controllers 950 and control processors 940. The concept can be further extended to include communication between individual processor cores in a multi-core processor.

Controller 950DFE uses virtual channel 980-V to communicate with active control processor 940A. The combined IP stack and Ethernet driver executing on controller 950DFE uses a virtual addressing scheme to direct control-processor-bound traffic on virtual channel 980 to either controller 940-1 (via path 980-1) or to controller 940-2 (via path 980-2), depending on which one of the controllers currently has the active role. This allows most software communicating from controller 950DFE to the active control processor to remain unaware of the actual address of that control processor, greatly simplifying development of software executing on controller 950DFE. The virtual addressing scheme will be described later in connection with FIGS. 12A-E.

In order to simplify the diagram, switches 960A and 960S from FIG. 9A are not shown in FIG. 9B. However, a person of ordinary skill in the art should understand that these same switches provide a physical path between controller 950DFE and active control processor 940A, and between controller 950DFE and standby control processor 940S. That is, logical paths shown in FIG. 9B (980-V, 980-1, and 980-2) actually flow through switches 960A and 960S. When the virtual addressing scheme referred to above directs traffic from controller 950DFE to active control processor 940A, this traffic flows through switch 960A. When the virtual address scheme directs traffic from controller 950DFE to standby control processor 940S, this traffic flows through switch 960S.

The concept of virtual channels to the active control processor is extended to other processors as well. Controller 950DSPE uses virtual channel 990-V to communicate with active control processor 940A. Controller 950DSPE also utilizes an IP stack and Ethernet driver to implement a virtual addressing scheme which directs control-processor-bound traffic on virtual channel 990 to either controller 940-1 (via path 990-1) or to controller 940-2 (via path 990-2), depending on which one of the controllers currently has the active role.

Several advantages of dual full-mesh switches have been discussed in connection with seamless controller switchover. Returning now to FIG. 9A, the full-mesh configuration also supports various forms of data plane redundancy. For example, since both active DFE 920A and standby DFE 920S have a link to active control processor 940A (through layer-2 switch 960A), DFE 920 can be switched over, without a corresponding controller switchover. That is, formerly-standby DFE 920S becomes active, and formerly-active DFE 920A goes to standby. Furthermore, using an addressing mechanism describe later in connection with FIG. 11, configuration operations for DFE 920 use an "active" virtual address and packets are automatically delivered to whichever DFE has the active role.

Note that in a DFE switchover, control processor 940A can remain the active control processor: no controller switchover is required. This architecture allows each component type with a redundant peer to be switched over without requiring a switchover of other component types.

The dual switch, full-mesh configuration supports DSPE redundancy in a similar manner, since both active DSPE 930A and standby DSPE 930S have a link to active control processor 940A (through layer-2 switch 960A). Similarly, the addressing mechanism of FIG. 11 allows configuration operations for DSPE 930 to use an "active" virtual address so that packets are automatically delivered to whichever DSPE has the active role. Data plane redundancy (DFE, DSPE and PHY) is described in further detail in connection with FIGS. 16-19.

Active control processor 940A typically performs other functions in addition to configuring elements in the data plane. For example, the active control processor 940A is typically responsible for downloading code to various other components within the network device 900, for configuring these components, and for monitoring the state or "health" of these components. The active control processor 940A is generally also responsible for controlling system-level peripherals in the network device 900. All control processors 940 have connections to other system components as necessary to implement these functions, so that any one of control processors 940 is able to assume the role of active controller.

In one embodiment, the components of the network device 900 reside on different cards. In this case, the active control processor 940A also acts as a chassis manager for all the cards in the system. A typical chassis manager is capable of resetting an individual card, of powering off an individual card, and of powering on an individual card. In one embodiment, the chassis manager has an I2C interface to other cards which allow it to: monitor card temperature; control/monitor speed of one or more fans in the chassis; control/monitor individual power supplies to cards. The active control processor 940A may also be called the "master controller" or the "system controller." All control processors 940 have connections to other cards as necessary to implement these functions.

The control plane redundancy features discussed above allow a seamless and efficient controller switchover. Later sections will discuss various aspects of redundancy in the data plane, including DFE switchover, DSP switchover and PHY switchover. The process of determining when to make any one of type various types of switchover will now be discussed in connection with FIG. 10.

Importantly, all switchover decisions are made by one component, namely, the active control processor 940A. That is, the active control processor 940A decides when and if to perform controller switchover, DFE switchover, DSP switchover, and PHY switchover. There is one exception to this rule: if active control processor 940A is malfunctioning, standby control processor 940S may decide to perform a controller switchover and become active. In one embodiment, this standby-driven switchover occurs when no communication to active control processor 940A is available, either through switch 960S or through switch 960A.

A decision to perform a switchover can be based on the status of a card, the status of a link, the status of a switch, and/or the failure of communication between components. Each of the various cards (910, 920,930, 940) in the network device 900 provides the standby control processor 940S with a periodic "health report". A health report 1010 contains one or more items 1020 of information related to the status of the card itself (hardware or software) or to its connectivity to other cards. Table 1 contains a list of exemplary health report items 1020 and a description of each.

TABLE 1

| HealthReport Item | Description |
| --- | --- |
| ProcessOrphan | software process is not responding |
| TaskOrphan | software task is not responding |
| IPCTimeout | destination has not responded to link monitor message in prescribed time |
| IPCLinkUp | switch link is up |
| IPCLinkDown | switch link is down |
| PhyUp | PHY status is up |

TABLE 1-continued

| HealthReport Item | Description |
| --- | --- |
| PhyDown | PHY status is down |
| MemoryThreshold | memory usage (as percentage) |
| GatewayUnreachable | lost ARP-connectivity to front-interface gateway |
| Voltage | current voltage on card/component within card |
| Current | current amperes on card/component within card |
| Temperature | current temperature on card/component within card |

As discussed earlier, each card (910, 920,930, 940) has a link to both control processors 940, through active switch 960A and standby switch 960S. Using these links, each card (910, 920,930, 940) sends a health report indication 1030 to active control processor 940A and to standby control processor 940S. Each control processor 940 examines the health report items 1020 contained in the received indication 1030, and determines a health score 1040 representing the overall health of the associated card. Health reports 1010 are communicated between active control processor 940A and to standby control processor 940S, so that each control processor 940 has the same information. Advantageously, the dual-switch, full-mesh switch architecture gives each controller or control processor on a redundant component two paths to report its health score 1040: one through active switch 960A, and another through standby switch 960S. Thus, if one path fails, the other is still available.

In a preferred embodiment, the mapping between a health score 1040 and a health report 1010 can be modified. For example, the fan speed item can be given a low weight relative to an IPC timeout item, and an orphaned task item can be give a weight between the other two items. Furthermore, in the preferred embodiment this modification can be done at run-time by the system administrator of the network device 900.

If a health score 1040 for a particular card is below a particular value, and that card is currently Active, active control processor 940A initiates a switchover for that card. If the card is currently Standby, the active control processor 940A initiates a recovery for that card. In one embodiment, different card types can have different failure values. For example, the failure score for a DFE 920 might be 50, while the failure score for a control processor 940 might be 70.

The above procedure is used when a health score 1040 identifies a particular card that has failed. When a communication failure is detected, a more elaborate procedure is used to determine the nature of the problem and the appropriate action. This process is described in more detail below, in connection with FIGS. 11A-C.

Network device 900 includes several hardware features which support controller switchover. A number of control signals are shared across the control plane, such as: power status and control signals for multiple power supplies; PHY-select control signals, which determine the data path between each PHY 910 and multiple DFEs 920; DSPE-select control signals, which determine the data path between each DSPE 930 and multiple DFEs 920; and DFE-select control signals, which determine the data path between each DFE 920 and multiple DSPE 930. (See FIGS. 16 17, and 18 for further details on how the control signals are used to configure the data path.)

Since these control signals are shared, they should be driven by only one control processor 940. Two separate bus arbitration bits are used to guarantee that exactly one control processor 940 gains mastership of the bus, and thus drives the shared control signals. Each bus arbitration bit represents a particular control processor 940 requesting mastership of the control plane. These bits are driven by hardware during the power-up sequence, and are also controllable by software.

When power is applied, control logic residing on the same card as control processor 940 will determine whether or not it resides in a particular ("master") slot. If Yes, that logic will assert its own corresponding bus arbitration bit (thus requesting mastership), and then examine the states of the two arbitration bits.

Under normal conditions, only one instance of control logic will be in the "master" slot, and so only one card will request mastership. In this case, the card requesting mastership will see the other bit as not asserted. This card then has mastership of the bus, and will drive the shared control signals.

However, if the control logic finds that both bus arbitration bits are set, the control logic will not drive the shared signals. In one embodiment, this condition is reported to control processor 940, which may attempt to determine the root cause of the failure, and to correct it.

After network device 900 has been initialized, software may control the arbitration bits as follows in order to perform a graceful switchover from active control processor 940A to standby control processor 940S. Active control processor 940A transfers bus mastership to the standby by setting to 1 the Mastership Request register that corresponds to standby control processor 940S. Active control processor 940A then reads back the same register. A status of 1 indicates that mastership has been granted to standby control processor 940S, and that control logic on active control processor 940A has released the Mastership Request line. A status of 0 indicates that active control processor 940A has failed to transfer mastership.

In the attempt to transfer mastership fails, network device 900 has other inventive hardware features to remedy the condition. When a mastership transfer fails, the control processor requesting the transfer uses a Controller Reset control signal to perform a hardware reset on the failing control processor card. After asserting the Controller Reset, the mastership transfer can be attempted again.

If failure is detected again, the requesting control processor can assume that the control logic on the failing control processor card has failed. In this case, the requesting control processor uses a Power Off signal to remove power to the failing control processor card. In one embodiment, a Power Off signal is supplied to digital power logic on each control processor card, for example, through an I2C bus.

Figure 11A:
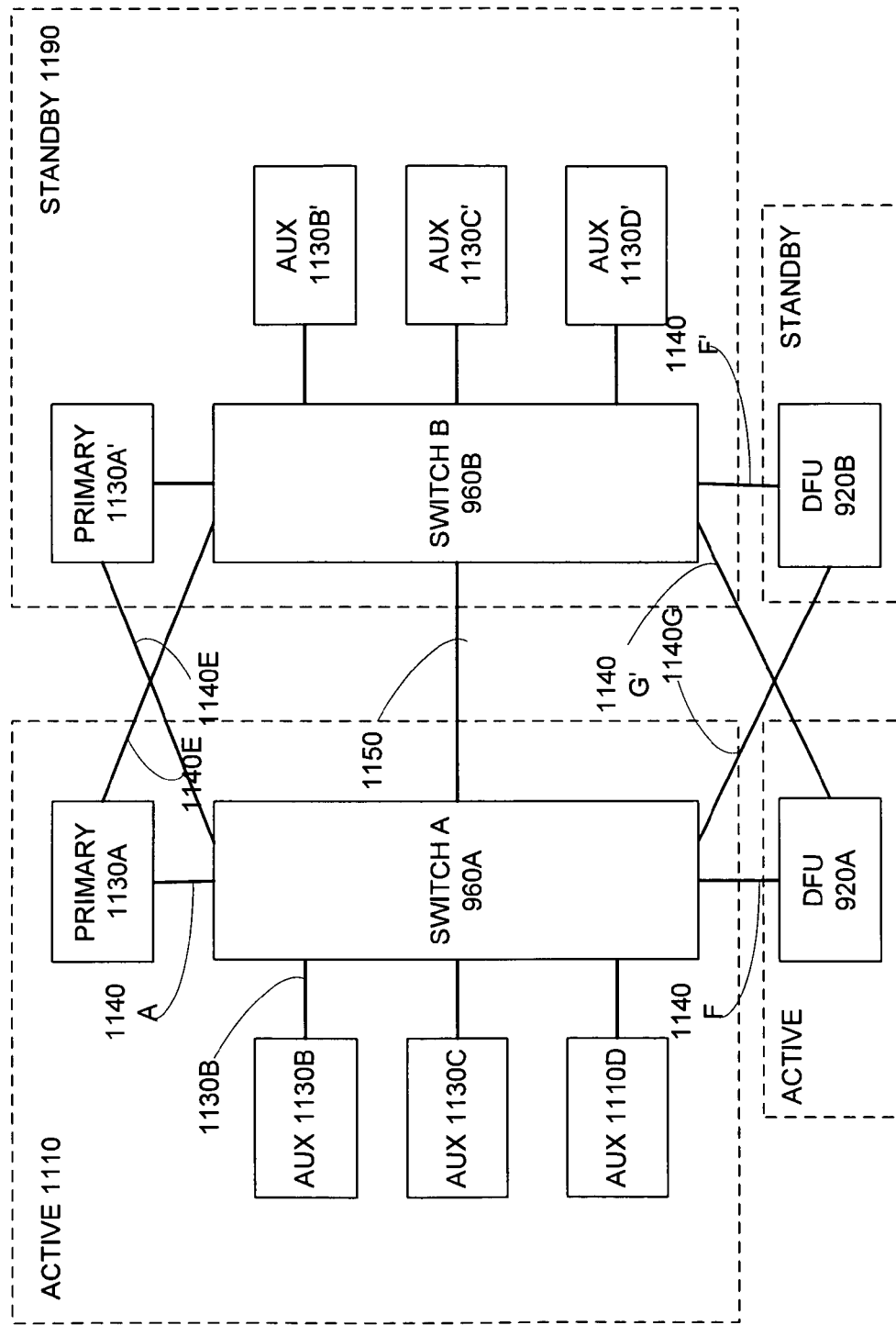
FIGS. 11A-C illustrate a procedure used by one embodiment of network device 900 to determine the nature of the communication problem, and the appropriate action.
Figure 11B:
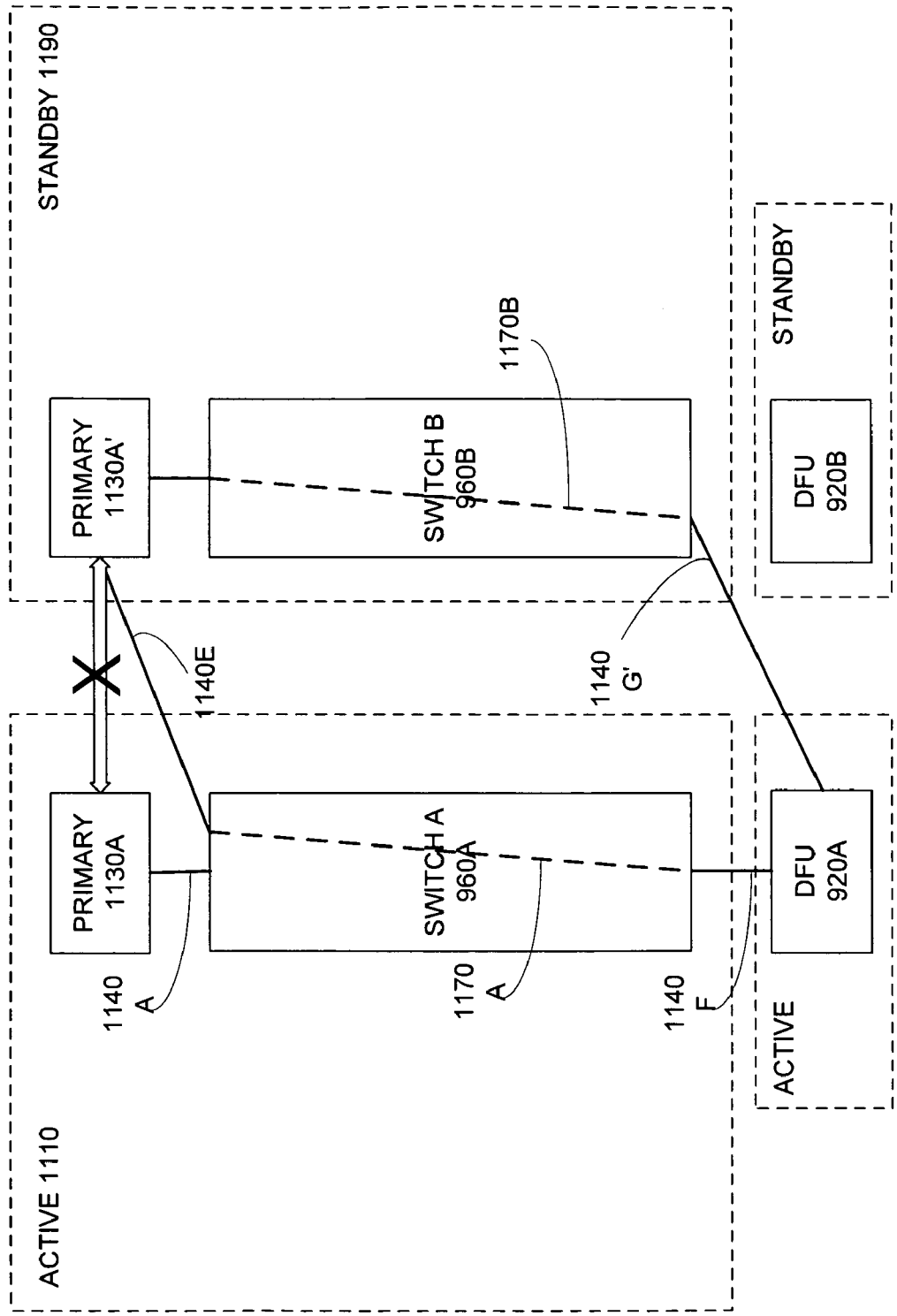
Figure 11C:
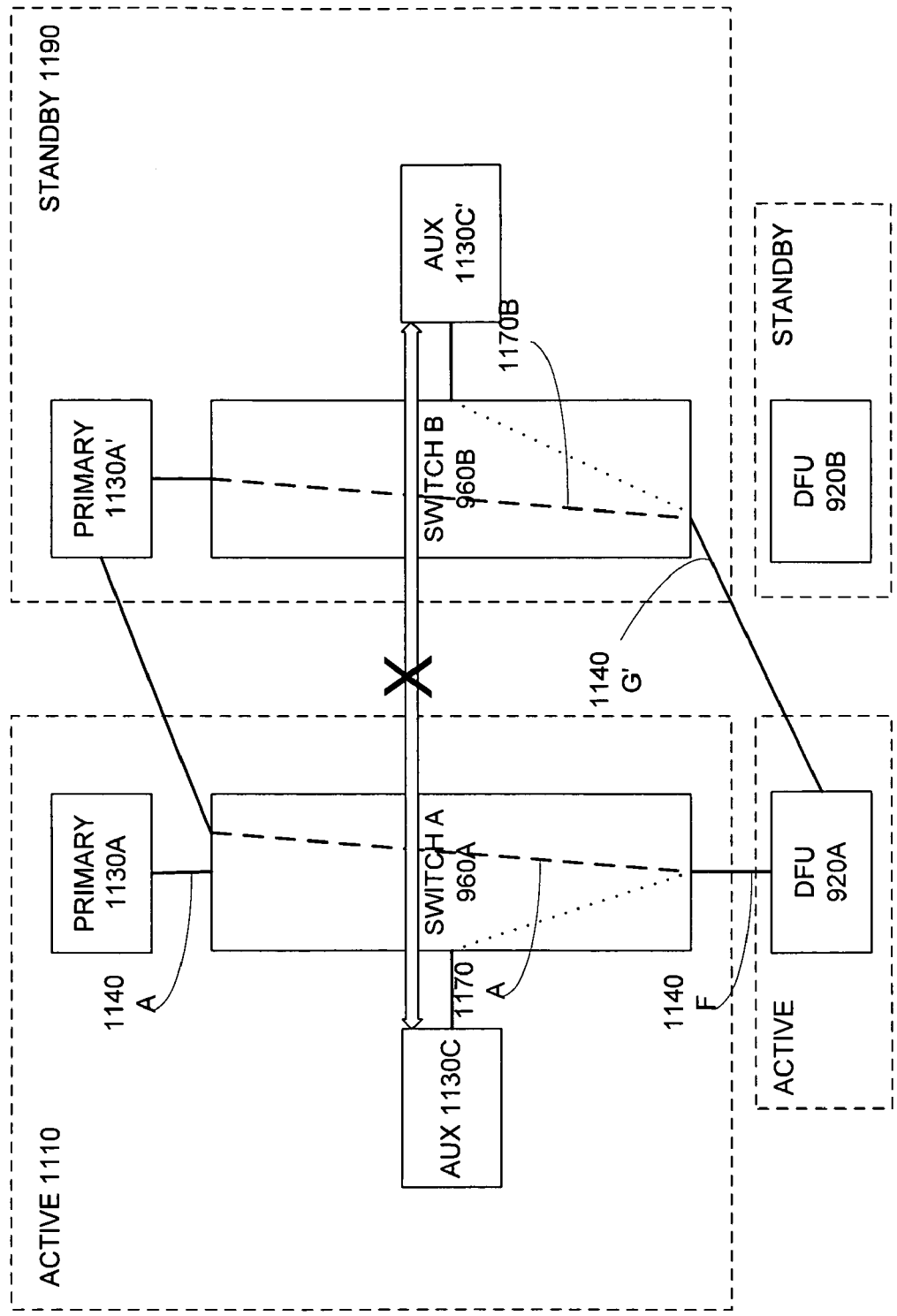

The decision to perform a switchover can be based on a failure in communicating health reports. However, when a communication failure is detected, the failure may be recoverable and switchover may not be required. FIGS. 11A-C illustrate a procedure used by one embodiment of network device 900 to determine the nature of the communication problem, and the appropriate action.

In the embodiment illustrated in FIGS. 11A-C, the control plane includes an active controller unit 1110 and a standby controller unit 1120. Each controller unit includes multiple CPUs 1130: one primary CPU (1130A, 1130A') and one or more auxiliary CPUs (1130B-D, 1130B'-D'). Each CPU communicates with its peer: active primary CPU 1130A communicates with standby primary CPU 1130A', active auxiliary CPU 1130B communicates with standby auxiliary CPU 1130B', etc.

In one embodiment, these peer communications are used to replicate the data of the active controller unit 1110 on the standby controller unit 1120, so that the state of the standby controller unit 1120 mirrors the state of the active controller unit 1110. Replication will not be discussed further in connection with FIGS. 11A-C. The processing tasks executed by the various CPUs, and the division of such tasks between primary and auxiliary CPUs, are not important for purposes of this discussion and will not be discussed here.

In this embodiment, communication between processors in the control plane is similar to that described in connection with FIG. 9, using multiple switches 960 to provide redundant connectivity. On the active controller unit 1110, the CPUs 1130A-D are coupled to the active layer-2 switch 960A by links 1140A-D. On the standby controller unit 1120, the CPUs 1130A'-D' are coupled to the standby layer-2 switch 960B by links 1140A'-D'.

The switches 960 assume the configuration shown in FIG. 11A, where links (active links 1140A-D and the standby links 1140A'-D') upon power-up. Switches 960 may be reconfigured to operate in a second configuration if certain switchover criteria are met. In this second configuration, links 1140A'-D' become active and links 1140A-D become inactive. This switch reconfiguration as a result of switchover will now be described.

In addition, the active primary CPU 1130A is coupled to the standby layer-2 switch 960B by link 1140E, while the standby primary CPU 1130A' is coupled to the active layer-2 switch 960A by link 1140E'. The active layer-2 switch 960A and the standby layer-2 switch 960S are coupled via link 1150. Finally, the active DFE 920A is coupled to both the active layer-2 switch 960A and the layer-2 switch 960B (via links 1140F and 1140F'), while the standby DFE 920B is coupled to both the standby layer-2 switch 960S and the active layer-2 switch 960A (via links 1140G and 1140G').

A periodic health report 1010 received by a primary CPU (1130A, 1130A') from a corresponding auxiliary CPU (1130B-D, 1130B'-D') may indicate that the communication channel between that auxiliary CPU and its peer is down. Each primary CPU also monitors the status of its own communication channel with its peer. When a primary CPU becomes aware of a communication failure, that CPU determines the next appropriate action. A controller switchover is the appropriate action when the source of the error involves the active controller 1130A. No switchover is needed if the source of the error involves the standby controller 1130A'. In that case, the appropriate action is to attempt a recovery of the standby controller 1130A'.

FIG. 11B illustrates the actions occurring when the standby primary CPU 1130A' detects that the communication channel 1160 to active primary CPU 1130A is down. This failure to communicate could be an indication of a problem with the active primary CPU 1130A. However, since redundant communication channels are provided by switches 960, this failure could also indicate a problem with one of the switches 960, with any of the links coupling the CPUs to the switches. To narrow down the source of the problem, the standby primary CPU 1130A' sends out multiple "pings" to the active DFE 920A, and the active DFE 920A should send a response to each. One ping (1170) is sent via active layer-2 switch 960A, and another ping (1170') is sent via standby layer-2 switch 960S.

If a reply is received to ping 1170' only, this indicates a problem with active layer-2 switch 960A. Since the problem involves the active controller 1110, standby primary CPU 1130A' performs a controller switchover as described above in connection with FIGS. 9 and 10.

If a reply is received to ping 1170 only, this indicates a problem with standby layer-2 switch 960S. Since the problem does not involve the active controller 1110, no switchover is needed. Instead, the standby primary CPU 1130A' goes into a recovery state, which may involve re-initializing standby layer-2 switch 960S, re-establishing links 1140E or 1140E', or restarting a communication task.

If replies are received to both pings, then both switches 960 are functioning properly, and the standby primary CPU 1130A' follows up with a request to active primary CPU 1130A for a health report 1010. If standby primary CPU 1130A' receives the requested health report 1010, then the communication failure was temporary and no further action is needed. If no health report 1010 is received, this indicates a problem with standby layer-2 switch 960B, or with one of the links (1140E, 1140E') between standby primary CPU 1130A' and standby layer-2 switch 960S. In this case, the standby primary CPU 1130A' goes into a recovery state.

The above discussion focused on a failure of the channel 1160 between the primary CPUs. FIG. 11C focuses on a failure of a communication channel 1180 between auxiliary CPU peers, for example, auxiliary CPUs 1130C and 1130C'. The failure of channel 1180 can be detected by the standby auxiliary CPU 1130C' directly, or can be reported via a health report 1010 from active auxiliary CPU 1130C. In either case, once the failure comes to the attention of the standby auxiliary CPU 1130C', that CPU gathers more information by sending out multiple requests to the active DFE 920A: one request (1190) sent via active layer-2 switch 960A, and another (1190') sent via standby layer-2 switch 960S.

Importantly, these requests (1190, 1190') are not "pings." Instead, these requests ask the active DFE 920A to generate pings addressed to another entity. In this example, the standby auxiliary CPU 1130C' asks the active DFE 920A to ping (1195, 1195') the active auxiliary CPU 1130C. If no reply is received to either ping (1195, 1195'), this indicates that active auxiliary CPU 1130C is not functioning properly, so the standby primary CPU 1130A' performs a controller switchover as described above in connection with FIG. 9. If replies are received for both pings, this indicates the link 1150 between the two switches 960 has failed, and the standby primary CPU 1130A' goes into a recovery state.

As discussed above, in normal operation the DFE 920 and the DSPE 930 communicate with active control processor 940a, but as a result of controller switchover, these elements communicate with standby control processor 940S instead. This switchover is accomplished in an inventive manner that is transparent to the DFE 920 and the DSPE 930, by using a "virtual" address for control plane messages. Importantly, this virtual address is associated with whatever controller currently has the role of active controller, rather than with a particular controller.

Figure 12A:
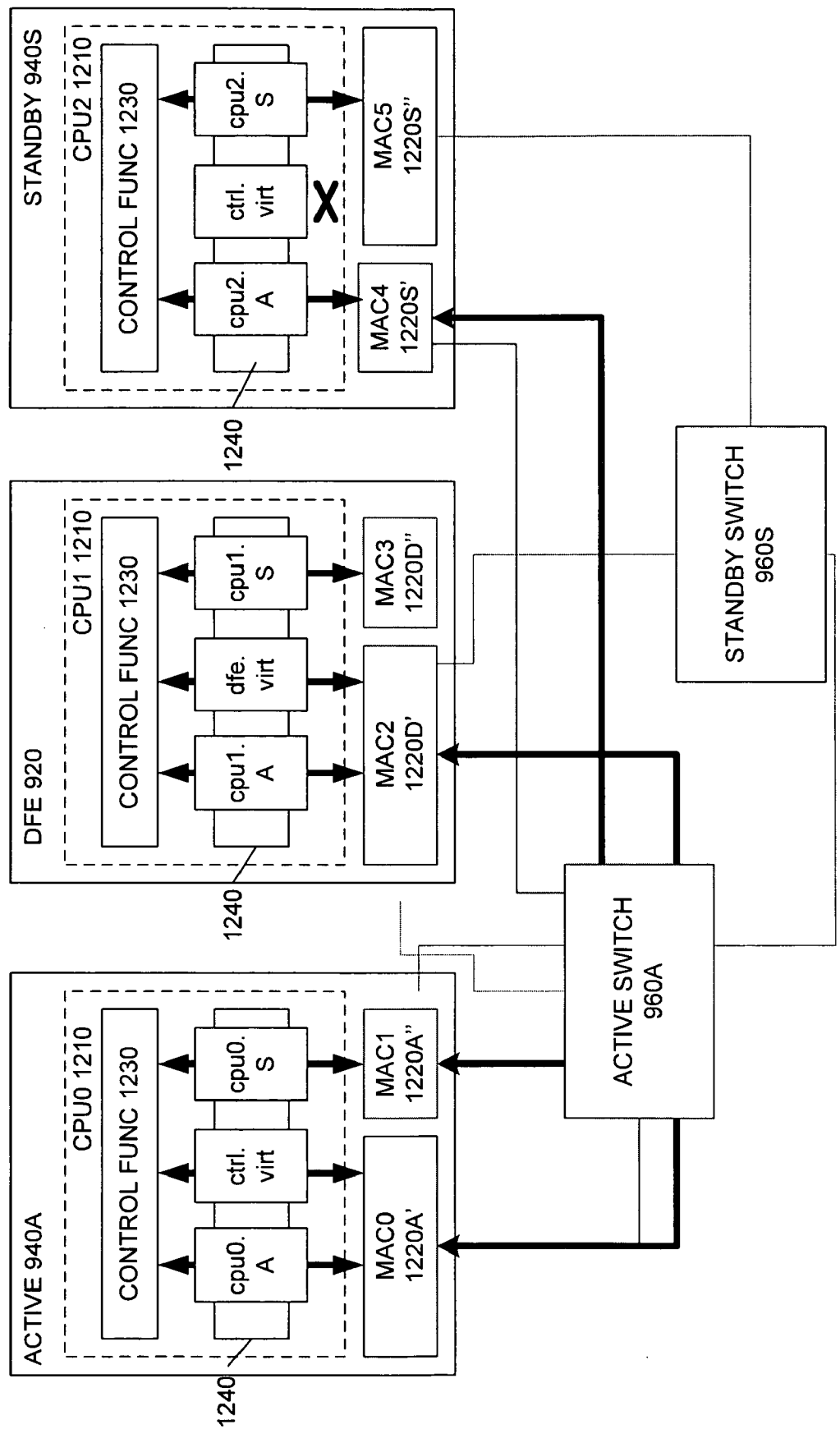
FIGS. 12A-E are block diagrams showing an inventive combination of hardware and software components to implement virtual addresses in the control plane.
Figure 12B:
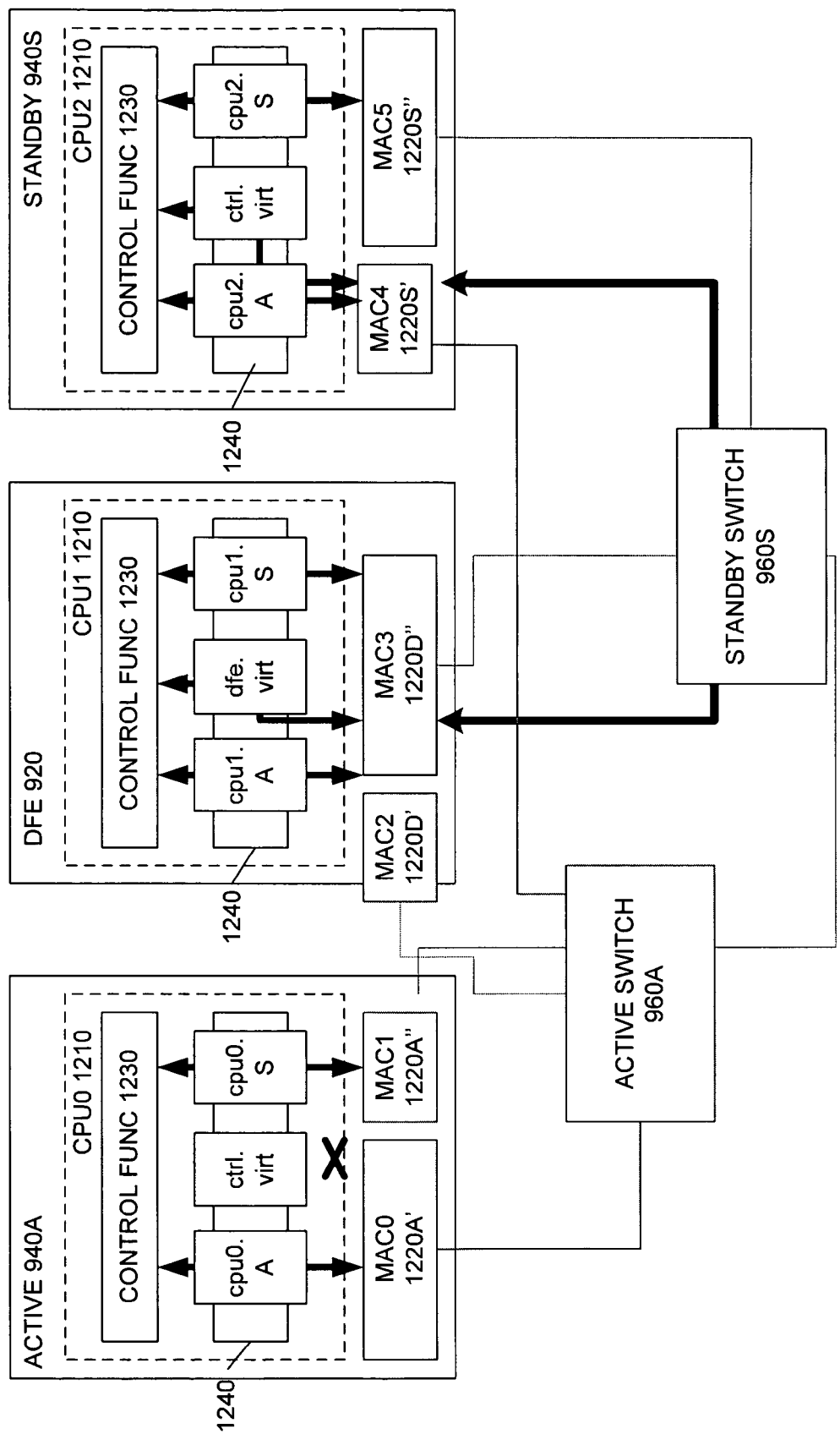

FIGS. 12A and 12B are block diagrams showing an inventive combination of hardware and software components to implement virtual addresses in the control plane. The DFE 920, active control processor 940A, and standby control processor 940S of FIG. 9 are shown in further detail. Each unit in the control plane includes a CPU 1210 and two media access control devices (MACs) 1220. One MAC 1220 is coupled to active layer-2 switch 960A, and the other is coupled to standby layer-2 switch 960S. A person of ordinary skill in the art should understand that the functionality described here as provided by a "MAC" can refer to a MAC layer (Ethernet) hardware interface, a MAC layer (Ethernet) software driver, or some combination of the two. With a connection to both switches, each unit can be said to reside on two "switchnets."

Each CPU 1210 executes a control function 1230 and an IP stack 1240. The control function 1230 uses services provided by the IP stack 1240 to exchange packets with the control function of other control plane components. Each IP stack provides three interfaces, each with its own IP address. Two of the interfaces have a fixed association with a particular switch. For example, interface "cpu0.A" connects controller 940A ("cpu0") with switch 960A, while interface "cpu0.S" connects controller 940A with switch 960S. Interface "cpu1.A" connects DFE 920 ("cpu1") with switch 960A, while interface "cpu1.S" connects DFE 920 with switch 960S. Finally, interface "cpu2.A" connects controller 940S ("cpu1") with switch 960A, while interface "cpu2.S" connects controller 940S with switch 960S. These switch-specific interfaces are called "utility" interfaces, and the IP address associated with each is a "utility address."

The third, or "virtual," interface does not have fixed association with a particular switch. Instead, a virtual interface is associated with the active switch. Furthermore, while both active control processor 940A and standby control processor 940S have virtual interfaces, only one of these two virtual interfaces is enabled at any particular time. Under normal operating conditions, the virtual interface on active control processor 940A is enabled, while the virtual interface on the standby control processor 940S is disabled. During controller switchover, the virtual interface on the standby control processor 940S is enabled, and the virtual interface on active control processor 940A is disabled.

This configuration allows a control plane component such as DFE 920 to communicate with the currently active controller by using a virtual address ("controller.virtual"), without knowledge of which controller or switch is active. Alternatively, one control plane component can also communicate with another through a specific switch, by using a utility address.

Component configuration and status operations are performed using virtual addresses, since these operations are not specific to a particular controller, switch, or link. These operations are instead targeted at a component serving a specific (active) role. In contrast, utility addresses are used when it is advantageous for a component to be aware of which switch or link is used for a message, so that the component can report communication problems specific to one switchnet, and can respond to problems with a particular switchnet by sending messages on the other switchnet.

One use for utility addresses is periodic communication between peer components to exchange context (state) information. Utility addresses may also be used for periodic "health" or status reports from each controller 950 to both control processors 940. (Health reports were discussed earlier in connection with FIG. 10. A link monitor function (described below), which tracks the status of switch links (e.g., up, down), is yet another use for utility addresses.

A general overview of the virtual addressing scheme will now be presented. To communicate with the currently active controller, the control plane component creates a message for delivery to the currently active control processor. The packet destination network address is a (role-specific) virtual address rather than a (switch-specific) utility address. The component sends this message on a virtual interface. This virtual interface delivers the message to the appropriate control processor as follows. The component has two MACs, each of which is coupled to a different switch. Each switch in turn is coupled to a particular controller (e.g., in slot 1).

Advantageously, the binding between the virtual interface and the MAC is dynamic. When the controller in slot 1 has the active role, then the virtual interface is bound to the MAC which is coupled (through one of the switches) to the controller in slot 1. When the controller in slot 2 has the active role, then the virtual interface is bound to the other MAC, which is coupled (through one of the switches) to the controller in slot 2. In this manner, delivery of messages to the currently active controller can be accomplished without a control plane being aware of which one of the controllers (e.g., slot 1 or slot 2) is active.

The virtual addressing scheme will now be describe in further detail in connection with FIGS. 12A and 12B. In this discussion, CPUs are referred to by arbitrary names, e.g., "CPU0" refers to the CPU on active control processor 940A. MAC addresses are also referred to by name: "MAC2" refers to the address of the MAC on standby control processor 940S. Furthermore, protocol interfaces are also referred to by names: "cpu0.A" refers to the utility interface on CPU0 that is specific to switch A; "cpu0.S" refers to the utility interface on CPU0 that is specific to switch S; and "cpu0.virt" refers to the virtual interface on CPU0. In an analogous manner, the IP address named "cpu0.virt" refers to the IP address of the virtual interface on CPU0. One skilled in the art will realize, however, that these names are used for ease of explanation, and that addresses are actually represented by byte sequences, and that CPUs may be represented by some form of device id rather than name.

FIG. 12A shows the flow of traffic between DFE 920 and active control processor 940A under normal operating conditions. Active control processor 940A sends a control packet to the DFE 920 over the virtual interface "control.virt," using a destination IP address of "dfe.virt." The MAC currently bound to "control.virt," MAC 1220A', uses the Address Resolution Protocol (ARP) to determine that the MAC address corresponding to IP address "dfe.virt" is "mac2." MAC 1220A' then adds a MAC header containing "mac2" as a destination MAC address and forwards the packet to the active layer-2 switch 960A. Active layer-2 switch 960A delivers the control packet to the MAC with a destination address matching "mac2." The matching MAC is the DFE MAC 1220D' that is coupled to the active switch. Based on the destination IP address ("dfe.virt"), the DFE MAC 1220D' delivers the control packet to the IP interface "dfe.virt" rather than to the interface "cpu1.A".

In the reverse direction, DFE 920 sends a control response to the controller that is currently active by using the DFE interface "dfe.virt" and a destination IP address of "control.virt." DFE MAC 1220D' uses ARP to determine that the MAC address corresponding to IP address "control.virt" is "mac0," then adds a MAC header containing "mac0" as a destination MAC address. DFE MAC 1220D' forwards the packet to active layer-2 switch 960A, which uses the MAC address "mac0" to deliver the response packet to active control processor 940A. Based on the destination IP address ("control.virt"), controller MAC 1220A' decides to deliver the control packet to the IP interface "control.virt" rather than to the IP interface "cpu0.A".

Link monitor packets from active control processor 940A to standby control processor 940S are transmitted on the active controller "cpu0.A" interface and contain the destination IP address "cpu2.A." Standby controller MAC 1220S' delivers these packets to the "cpu2.A" interface, since the virtual interface is disabled. In a similar manner, link monitor packets in the reverse direction are transmitted on the standby controller "cpu2.A" interface and contain the destination IP address "cpu0.A". The active controller MAC 1220A' delivers these packets to the "cpu0.A" interface rather than the IP interface "control.virt", based on the destination IP address.

FIG. 12B shows the flow of traffic between DFE 920 and active control processor 940A after a controller switchover. The virtual interface on the formerly-active controller 940A is disabled, while the virtual interface on the now-active controller 940S is enabled. When the virtual interface on controller 940S is enabled, the ARP protocol on each CPU updates IP-to-MAC mapping: the IP address "control.virt" is now mapped to MAC address "mac5" (controller 940S) rather than "mac0" (controller 940A). In addition, the virtual interface on DFE 920 is moved from the MAC 1220D' that is coupled to layer-2 switch 960A, to the MAC 1220D" that is coupled to layer-2 switch 960S. The ARP protocol also updates the mapping for "dfe.virt" to "mac3." Furthermore, the links coupling layer-2 switch 960S to DFE 920, controller 940S, and controller 940A, are made active, while the links coupling layer-2 switch 960A to DFE 920, controller 940S, and controller 940A, are made inactive.

Although controller 940S is now active rather than controller 940A, the behavior of DFE 920 in communicating with the active controller is unchanged: DFE 920 transmits a control response to the active controller as before, using the IP address "control.virt". DFE MAC 1220D" determines that the MAC address corresponding to IP address "control.virt" is "mac5," then adds a MAC header containing "mac5" as a destination MAC address. DFE MAC 1220D" forwards the packet to the now-active layer-2 switch 960B, which uses the MAC address "mac5" to deliver the response packet to the MAC 1220S" on the now-active controller 940S. Based on the destination IP address ("control.virt"), the controller MAC 1220S" decides to deliver the control packet to the IP interface "control.virt" on the controller, rather than to the IP interface "cpu2".

Figure 12C:
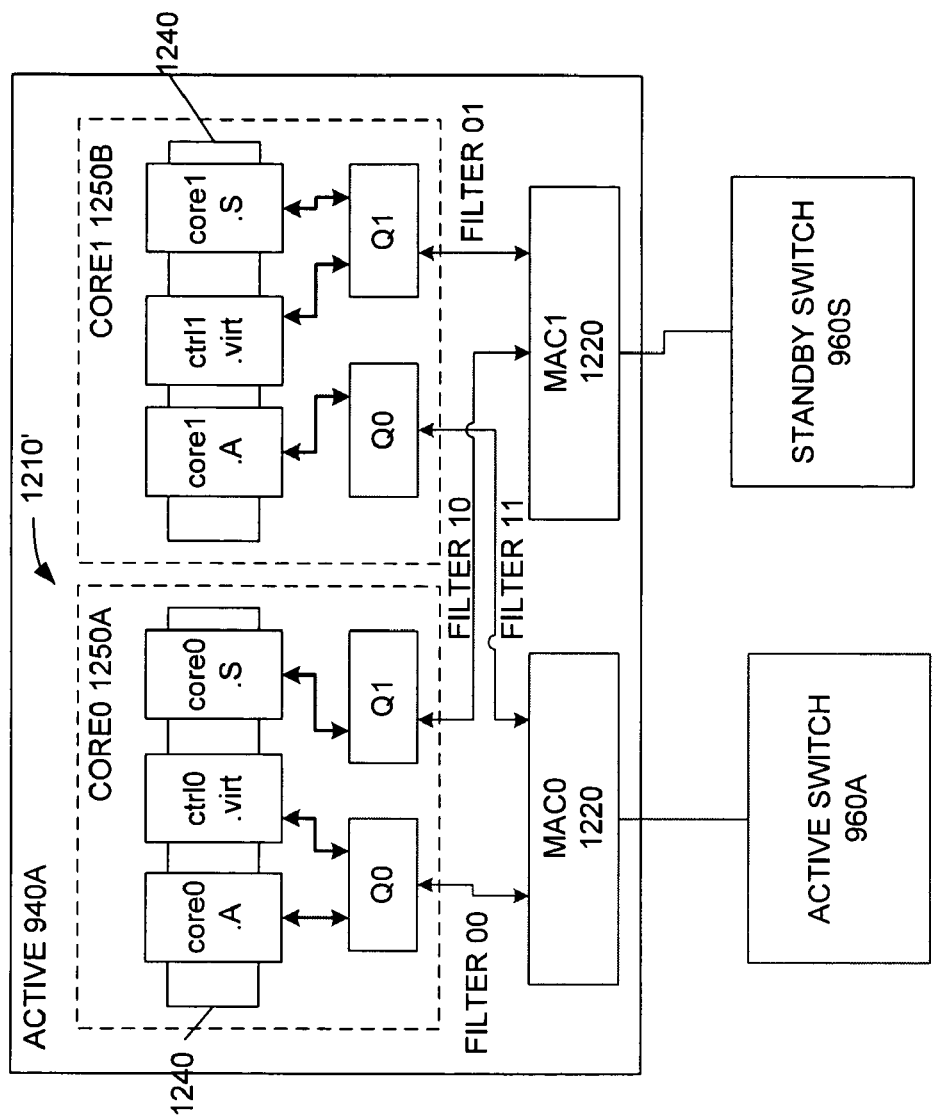
Figure 12D:
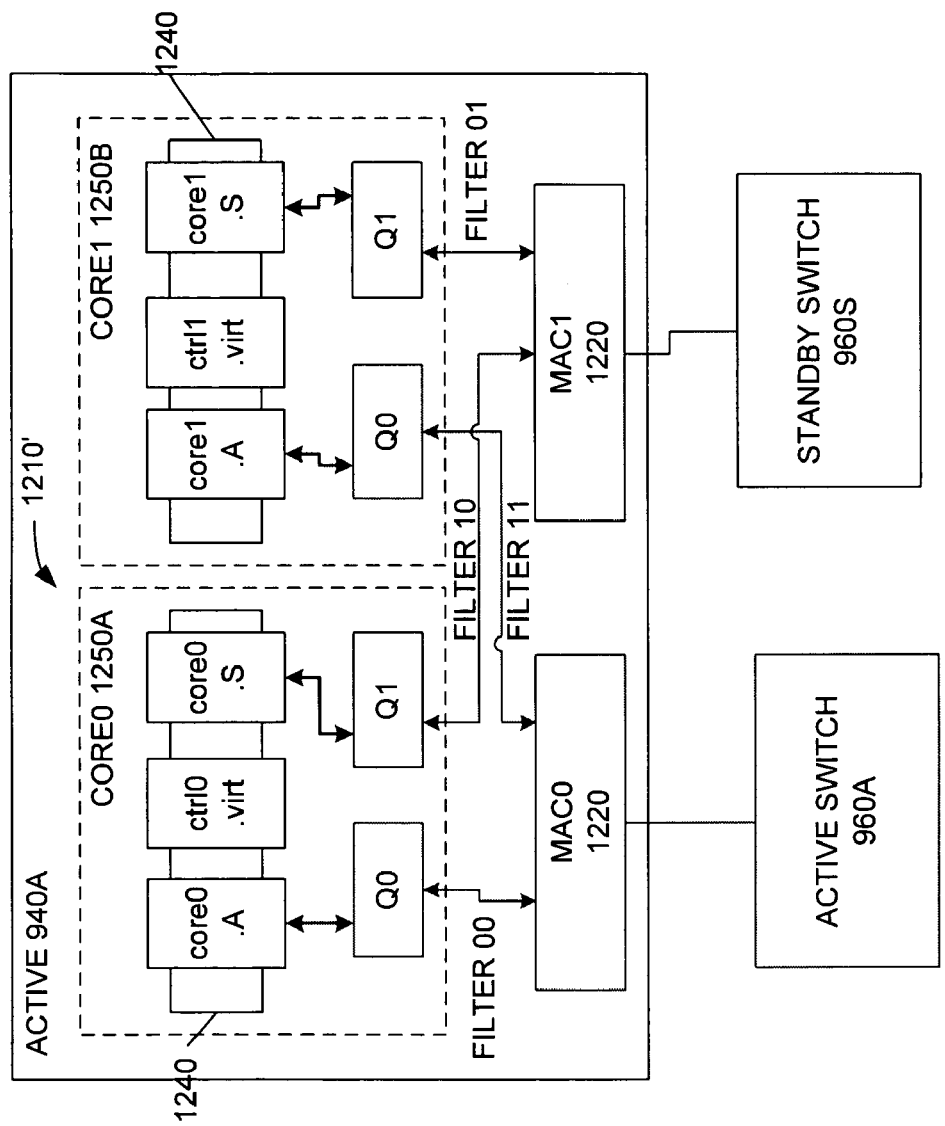

FIGS. 12C and 12D illustrate the use of virtual addresses with another active controller embodiment, one in which a CPU includes multiple cores. FIG. 12C shows an embodiment of active control processor 940A that includes Core0 (1250A) and Core1 (1250B). Each core 1250 of a CPU 1210 executes an IP stack 1240, where each IP stack 1240 provides two utility interfaces and one virtual interface. Thus, there are two stacks 1240 executing on active control processor 940A. There are also two MACs 1220: MAC0 and MAC1. However, the correspondence between MACs 1220 and stacks 1220 is not one-to-one. Instead, the embodiment of FIG. 12C supports redundancy by associating MACs 1220 and stacks 1220 in an inventive manner, including the use of multiple MAC queues and MAC filters.

The relationship between MACs 1220 and stacks 1220 is as follows. MAC0 uses a first filter (Filter 00) to direct some incoming packets to Core0. Filter 00 on MAC0 accepts incoming packets with a destination MAC address of "Core0.Mac0." These packets are directed to a MAC0-specific packet queue for Core0, from which the packets are delivered to the Core0 utility interface associated with switch A ("Core0.A"). If switch A is active, Filter 00 also accepts incoming packets with a destination MAC address of "Core0.Virt". These packets are also directed to the packet queue for Core0, from which the packets are delivered to the Core0 virtual interface.

An analogous filter, Filter 01, exists on MAC1 to direct some incoming packets to Core1. Filter 01 on MAC1 accepts incoming packets with a destination MAC address of "Core1.Mac1." These packets are directed to a MAC1-specific packet queue for Core1, from which the packets are delivered to the Core1 utility interface associated with switch A ("Core1.A"). If switch A is active, Filter 01 also accepts incoming packets with a destination MAC address of "Core1.Virt". These packets are also directed to the packet queue for Core1, from which the packets are delivered to the Core1 virtual interface.

MAC1 also uses a second filter, Filter 10, to direct some incoming packets to Core0. Filter 10 on MAC1 accepts incoming packets with a destination MAC address of "Core0.Mac1." These packets are directed to a MAC1-specific packet queue for Core0, from which the packets are delivered to the Core0 utility interface associated with switch S ("Core1.S").

Finally, MAC0 uses a second filter, Filter 11, to direct some incoming packets to Core1. Filter 11 on MAC0 accepts incoming packets with a destination MAC address of "Core1.Mac0." These packets are directed to a MAC0-specific packet queue for Core1, from which the packets are delivered to the Core1 utility interface associated with switch A ("Core1.A").

In FIG. 12D, standby control processor 940S contains two MACs 1220 and multiple cores. As before, four MAC filters and two MAC-specific queues are used to provide redundancy on standby control processor 940S. However, the filters are configured in a different manner, such that packets with virtual addresses are not delivered. Specifically, Filter 00 on MAC0 accepts incoming packets with a destination MAC address of "Core0.Mac0", and the packets are delivered to the Core0 utility interface associated with switch A ("Core0.A"). Filter 01 on MAC1 accepts incoming packets with a destination MAC address of "Core1.Mac1", and the packets are delivered to the Core1 utility interface associated with switch A ("Core1.A"). Filter 10 on MAC1 accepts incoming packets with a destination MAC address of "Core0.Mac", and the packets are delivered to the Core0 utility interface associated with switch S ("Core1.S"). Finally, Filter 11 on MAC0 accepts incoming packets with a destination MAC address of "Core1.Mac0", and the packets are delivered to the Core1 utility interface associated with switch A ("Core1.A").

In the example embodiments of FIGS. 12C and 12D, control processor 940 includes a CPU (1210) with two cores (1250). Control processor 940 also includes two MACs (1220). Thus, a MAC exists for each core.

Figure 12E:
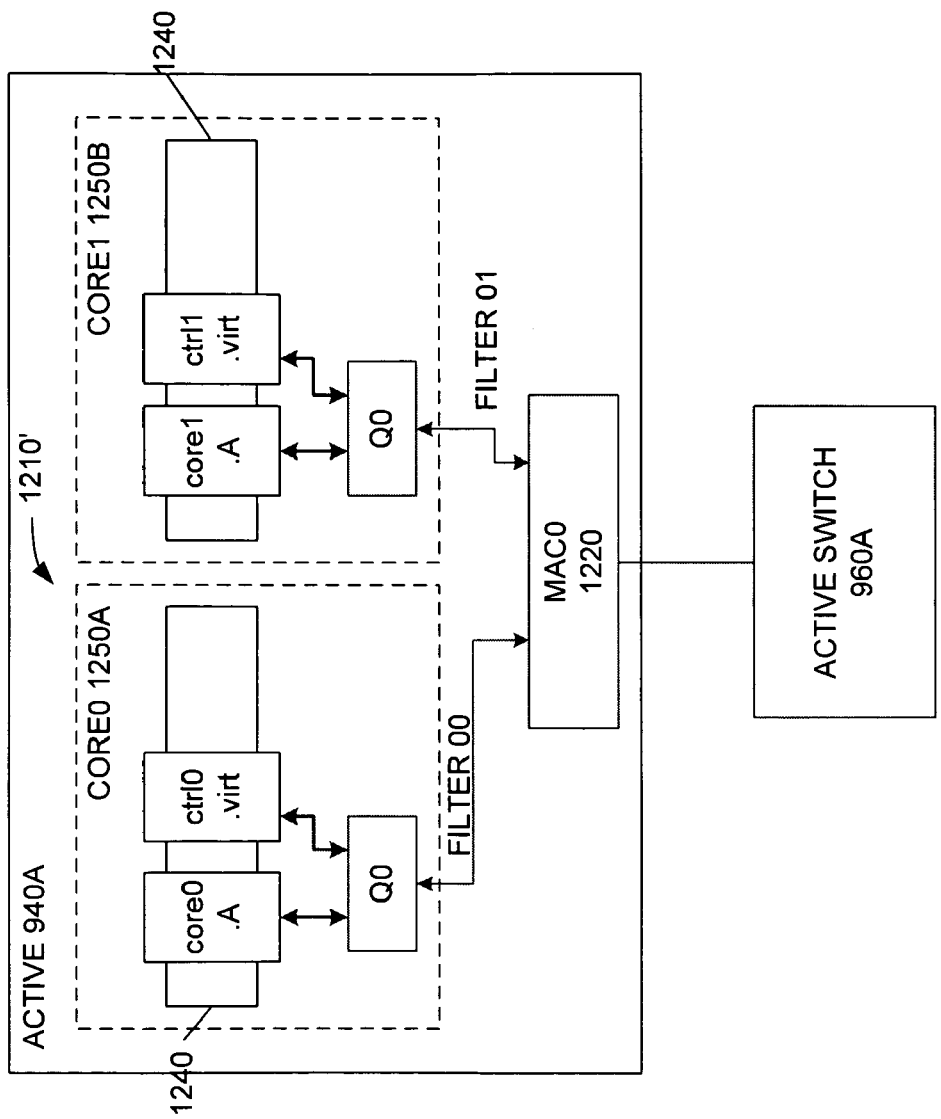

FIG. 12E illustrates another embodiment of control processor 940, which includes a two-core CPU (1210') and a single MAC 1220 coupled to active layer-2 switch 960A. This single-link CPU can be used, for example, for auxiliary processing tasks, while the dual-MAC, dual-link embodiment of FIGS. 12C and 12D acts as the primary controller.

Each core 1250 executes an IP stack 1240. In contrast to FIGS. 12C and 12D, the IP stack 1240 in FIG. 12E provides two interfaces rather than three: one utility address (associated with active layer-2 switch 960A) and one virtual address. As before, MAC filters and MAC-specific queues are used to provide redundancy, but with a single MAC only two filters are needed.

Filter 00 accepts incoming packets with a destination MAC address of "Core0.Mac0", and the packets are delivered to the single Core0 utility interface ("Core0.A"). If switch A is active, Filter 00 also accepts incoming packets with a destination MAC address of "Core0.Virt". These packets are also directed to the packet queue for Core0, from which the packets are delivered to the Core0 virtual interface.

Filter 01 accepts incoming packets with a destination MAC address of "Core1.Mac0", and the packets are delivered to the single Core1 utility interface ("Core1.A"). If switch A is active, Filter 01 also accepts incoming packets with a destination MAC address of "Core1.Virt". These packets are also directed to the packet queue for Core1, from which the packets are delivered to the Core1 virtual interface.

Figure 13:
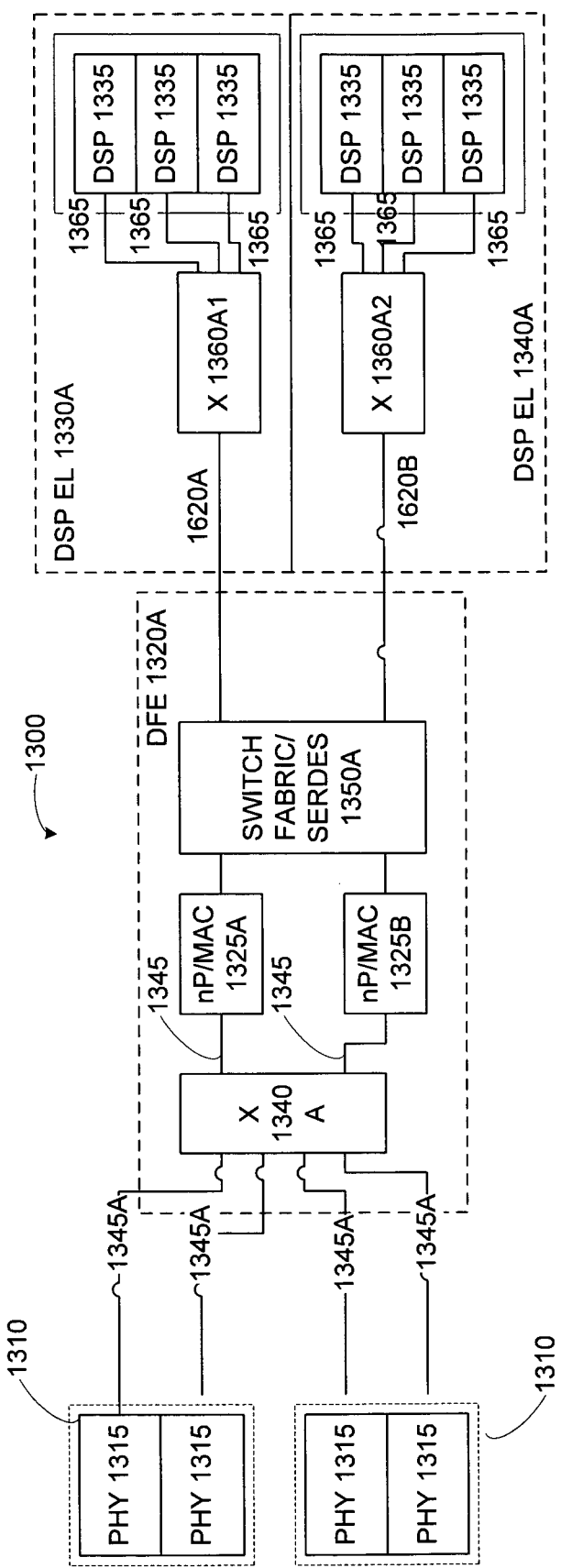
FIG. 13 is a hardware block diagram illustrating a network device 1300 that includes a redundant data forwarding plane with inventive features.

FIG. 13 is a hardware block diagram illustrating a network device 1300 that includes a redundant data forwarding plane with inventive features. The inventive features will be described later in connection with FIGS. 14-19, while FIG. 13 illustrates components which are common to the embodiments of FIGS. 14-19.

The data forwarding plane 1305 includes multiple copies, or instantiations, of different component types. Multiple PHY cards 1310 are included, and each PHY card 1310 includes two individual PHYs 1315. Data forwarding element (DFE) 1320 includes two network processors 1325, each including an integrated MAC interface. (In another embodiment, the MAC interface is a separate component coupled to the network processor 1325.) Finally, the data forwarding plane 1305 includes multiple DSP elements 1330, where each DSP element 1330 includes multiple DSPs 1335.

Using multiple components of the same type is typical for a network device, as is using multiple boards of the same type, and multiple processors on a board. In addition, some embodiments use processors which contain multiple cores. However, although these example embodiments utilize multiple instantiations at various levels (e.g., board, processor, core), it is important to note that the inventive data plane redundancy features described below require only one component type to be duplicated—the component type that is being made redundant. Multiple instantiations of the other component types are thus optional.

DFE 1320 is associated with a layer-2 switch 1340, which is different than layer-2 switch 960 in the control plane. Point-to-point links 1345 couple each network processor 1325 to the layer-2 switch 1340, and each individual PHY 1315 to the layer-2 switch 1340.

In a full-mesh configuration, the layer-2 switch 1340 can provide a data path between each network processor 1325 and each individual PHY 1315. However, the layer-2 switch 1340 associated with the DFE 1320 is instead programmed so that ingress packets from all PHYs 1315 residing on a particular PHY card 1310 are directed to one particular network processor 1325. The layer-2 switch 1340 is further programmed so that all packets leaving a particular network processor 1325 are directed to one of the multiple PHY cards 1310. In FIG. 13A, layer-2 switch 1340 is programmed so that network processor 1325a handles traffic for PHY card 1310a, while network processor 1325b handles traffic for PHY card 1310b.

Another embodiment (not shown) uses additional PHY cards 1310, and associates a network processor 1325 with a group of PHY cards so that network processor 1325a handles traffic for one group of PHY cards and network processor 1325b handles traffic for another group of PHY cards.

Data packets travel from an ingress PHY 1315 to one of the network processors 1325, and from there to a switch fabric 1350. The switch fabric 1350 (which may include a traffic manager) then switches each data packet to either a network processor 1325 for egress processing, or on toward DSP elements 1330 for a DSP operation such as transcoding. One skilled in the art will understand the use of switch fabrics and traffic managers to forward packets through the data forwarding plane 1305, so these topics will not be discussed further.

Each DSP element 1330 has an associated layer-2 switch 1360. Point-to-point links 1365 couple each individual DSP 1335 to the layer-2 switch 1360, and also couple each network processor 1325 to the layer-2 switch 1360 (via the switch fabric 1350). In this design, switch fabric 1350 also includes a serializer/deserializer (SERDES) which combines packets from both network processors 1325 traveling to a particular layer-2 switch 1360 into a single serial stream.

In this configuration, packets from either network processor 1325 with a packet header indicating a destination reachable through layer-2 switch 1360A are switched by the switch fabric 1350 onto serial link 1365A (connected to layer-2 switch 1360A). Similarly, packets from either network processors 1325 with a packet header indicating a destination reachable through layer-2 switch 1360B are switched by the switch fabric 1350 onto serial link 1365B (connected to layer-2 switch 1360B). The switch fabric 1350 in combination with layer-2 switch 1360 thus provides a data path between each network processor 1325 and each individual DSP 1335.

In another embodiment (not shown), DSP element 1330 is a motherboard on which a microprocessor resides. Daughtercards plug into the motherboard, and multiple DSPs reside on each daughtercard. In this embodiment, the layer-2 switch 1360 (connected to the DFE 1320) resides on the motherboard. In addition, each daughtercard has a layer-2 switch. The switches are connected in a two-level hierarchy, with a link between each layer-2 switch on the daughtercards and the layer-2 switch 1360 on the motherboard. The hierarchical arrangement allows the number of DSPs on a daughtercard to be increased without a similar increase in the number of inputs to the layer-2 switch 1360 on the motherboard. Thus, this particular embodiment improves scalability.

In the embodiment described above, the layer-2 switch 1360 allows packets to be efficiently delivered from an ingress network processor (nP) 1325A to a DSP element 1330 for transcoding, and back to an egress nP 1325B. The ingress nP 1325A uses stored state or context information, in combination with packet header information, to determine which DSP element 1330 the packet is delivered to. Existing solutions for deciding which egress nP 1325B the packet is directed are unsatisfactory. Having the DSP maintain its own stored context to determine the return endpoint is costly, yet having the DSP share the nP's stored context is often infeasible (e.g., when the DSP element 1330 and the network processor 1325 are on different boards).

Instead of using context information to determine the return endpoint, the endpoint could be stored in the packet itself. It is preferable to specify the return endpoint address as an Ethernet (layer-2) address, to leverage layer-2 switch 1360 and avoid costly processing at layers above layer-2: avoiding the use of layer-3 (IP) headers for delivering the media packets to destinations after the ingress processor, means DSPs 1335 are not required to support MAC or IP address aliasing.) The DSP cannot obtain the layer-2 destination address from the source address of the original packet leaving the ingress nP, because the ingress nP may be different from the egress nP. The embodiment described in FIGS. 14A and 14B uses an inventive approach to solve this problem, storing the return address in the packet itself in a way that is transparent to the layer-2 switch 1360 and to the DSP element 1330.

This embodiment solves another problem as well, which occurs when the nPs are layer-1 endpoint devices and the DSPs are layer-2 endpoint devices. (For example, in the embodiment of FIG. 13, nPs 1325 are coupled to a layer-1 switch and DSPs 1335 are coupled to a layer-2 switch.) In this case, the layer-2 switch would not operate properly without special management and configuration of the switch forwarding tables. In an inventive solution described below in connection with FIGS. 15A and 14B, inventive conversion logic is inserted between layer-2 switch 1360 and layer-1 switch fabric 1350. To DSPs 1335, this logic is addressable as a collection of layer-2 destination addresses. DSPs 1335 uses one of these layer-2 addresses as a destination address in packets exiting DSPs 1335. (As described earlier, the address used is actually stored in the packet itself rather than obtained from context memory.)

All of these addresses are delivered by the layer-2 switch to the conversion logic. However, the particular layer-2 destination address used by the DSP 1335 indicates the appropriate return endpoint: it identifies one of NPs 1325, even though NPs are not directly addressable at layer-2. The conversion logic then maps the layer-2 destination address—which was used for delivery to the conversion logic—to the layer-1 address of the corresponding egress NP 1325B.

Figure 14A:
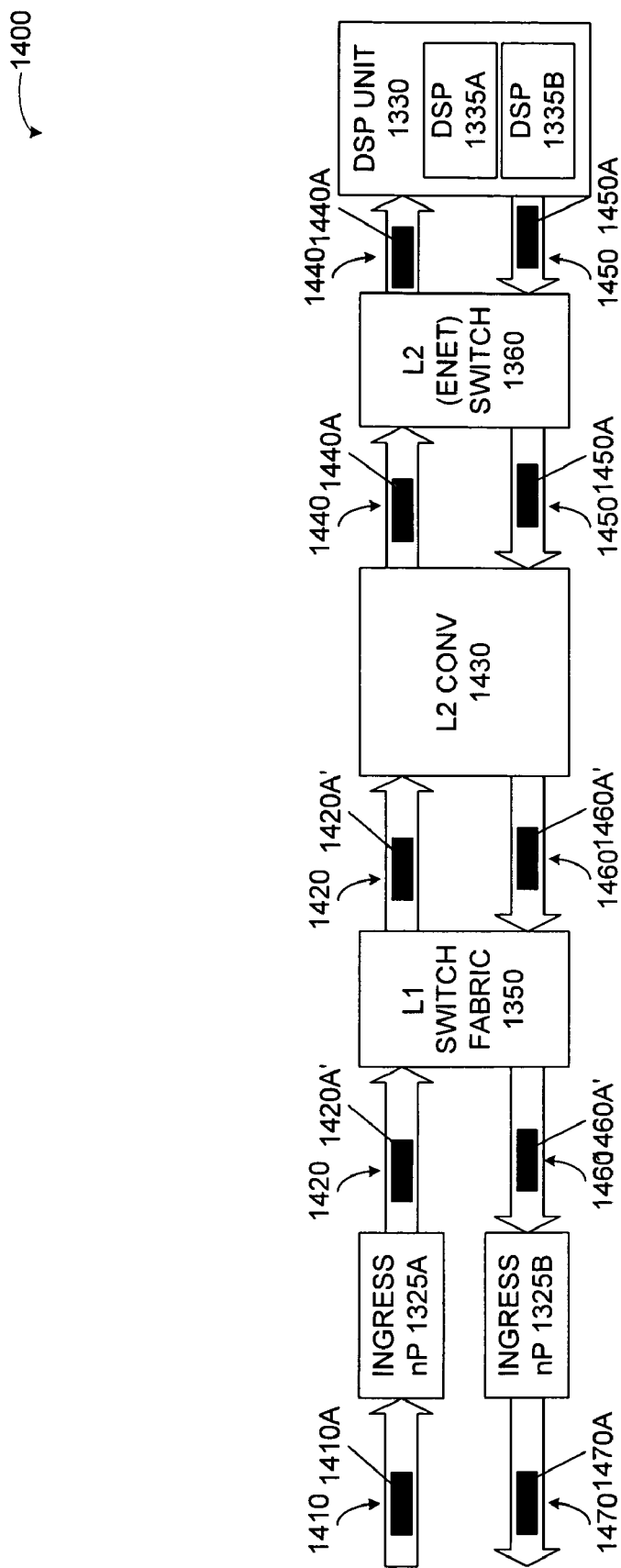
FIGS. 14A-B are data flow diagrams showing how packet headers are modified by various components of the data forwarding plane.

FIG. 14A presents an overview of how packet headers are modified by various components of the data forwarding plane in a network device 1400 that includes this inventive feature. An ingress RTP packet 1410, originating from outside of the network device 1400, arrives at an ingress nP 1325A. The ingress nP 1325A determines the address of the DSP (in this example, DSP (1335A) that will transcode the RTP packet 1410, and the address of the egress nP (here, nP 1325B). The ingress nP 1325A removes the layer-2 Ethernet header 1410A from the packet and adds a different header (1420A'). This header 1420A' specifies the transcoder DSP and the egress nP, but does not use the Ethernet format. The reasons for using a non-Ethernet header 1420A', as well as details about this header format, will be discussed shortly in connection with FIG. 14B.

The resulting packet 1420 is forwarded on to the switch fabric 1350, which transports the packet 1420 across the fabric. Because the fabric switches on layer-1, the fabric is unaffected by the use of the internal layer-2 header. However, the next hop—layer-2 switch 1360—expects packets with a layer-2 Ethernet header. Therefore, the switch fabric 1350 delivers the packet to conversion logic 1430, which removes non-Ethernet header 1420A' and uses the information inside to build an appropriate layer-2 Ethernet header 1440A. Importantly, this conversion (explained in more detail shortly) results in a layer-2 Ethernet header containing the address of the egress nP 1325B, but as a source address rather than a destination address.

The resulting packet 1440 is forwarded to the layer-2 switch 1360, which switches on the layer-2 Ethernet header 1440A to deliver the packet 1440 to DSP 1335A. The DSP 1335A transcodes the RTP payload inside packet 1440 to produce packet 1450. To direct packet 1450 to the egress nP 1325B, the DSP 1335A obtains the appropriate address for the Ethernet header 1450A by simply swapping the Ethernet source and destination address.

Packet 1450 is delivered through the layer-2 switch 1360 to the conversion logic 1430, where the Ethernet header 1450A is used to build a new packet 1460 with non-Ethernet header 1460A'. The switch fabric 1350 delivers the packet 1460 to the egress nP 1325B. The egress nP 1325B determines the next hop for the packet 1460, and modifies headers appropriately to produce packet 1470, which then exits the network device 1400. Note that although the ingress and egress nP are different in the example of FIG. 14A, in some scenarios the ingress nP and egress nP can be the same.

Figure 14B:
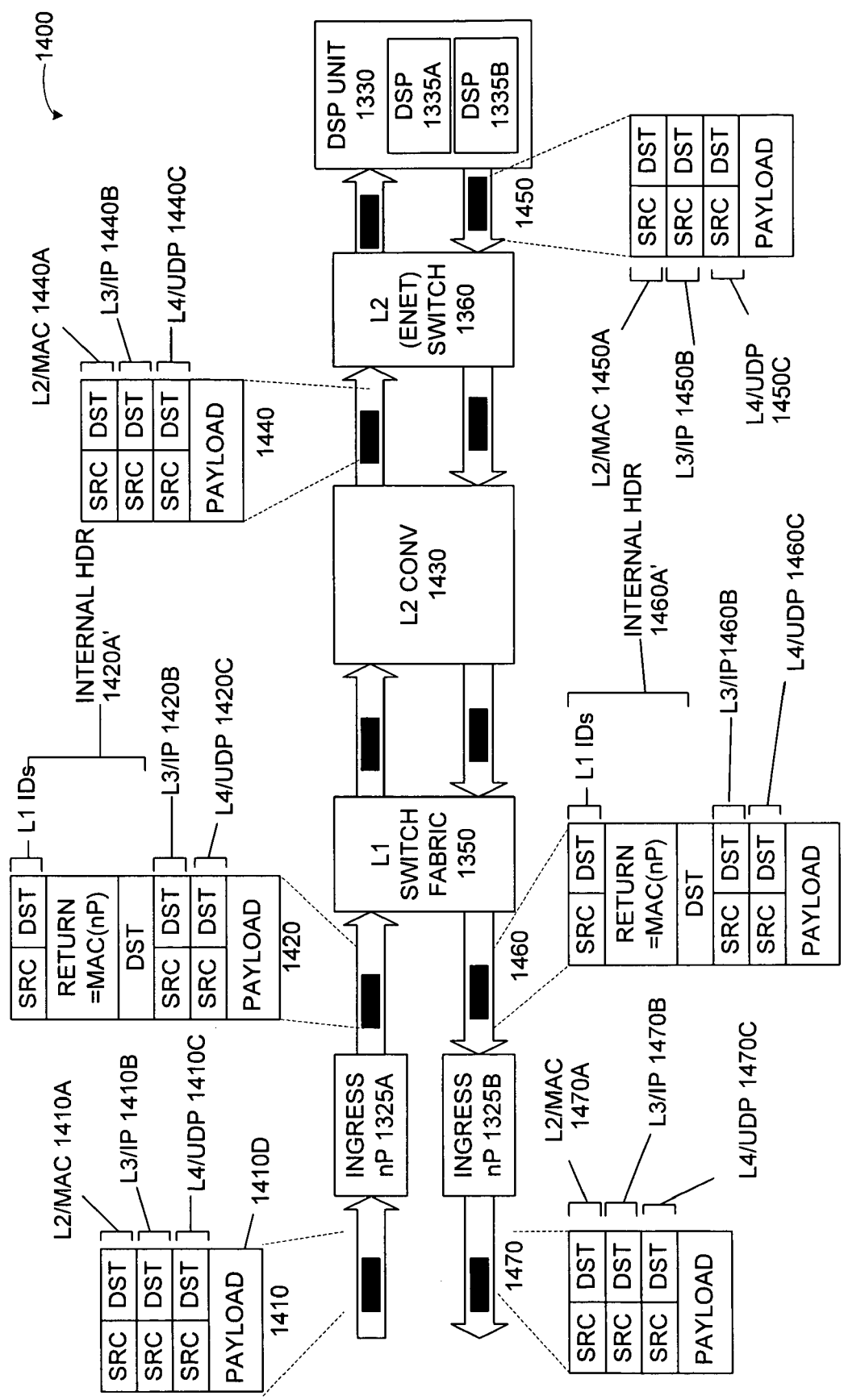

The data flow of FIG. 14A will now be examined in more detail in FIG. 14B. The ingress RTP packet 1410 contains a layer-2 Ethernet header 1410A, a layer-3 header 1410B, a layer-4 header 1410C, and an RTP payload 1410D. The ingress nP 1325A examines the layer-3 and layer-4 headers (1410B,C) to determine what action is appropriate for the RTP packet 1410, a process known as classification. In particular, the combination of layer-3 addresses (source and destination) and layer-4 ports (source and destination) is used to classify the packet as belonging to a particular "flow" between two RTP endpoints. A flow can be specified as a 4-tuple: IP source address, TCP or UDP source port, IP destination address, TCP or UDP destination port.

Each flow may require network address translation (NAT), in which source and destination addresses and/or ports are replaced with flow-specific values. (NAT should be familiar to a person of ordinary skill in the art.) Therefore, the ingress nP 1325A maintains a set of data associated with each flow, also known as "resultant data". The ingress nP 1325A performs a look-up using the flow tuple, or an internal representation of the flow tuple such as a flow identifier). If the resultant data so indicates, the ingress nP 1325A replaces the addresses (source and destination) in the layer-3 header 1410B with addresses from the resultant data, resulting in layer-3 header 1420B. Similarly, the ingress nP 1325A replaces the ports (source and destination) in the layer-4 header 1410C with ports from the resultant data, resulting in a layer-4 header 1420C.

One skilled in the art of will understand the use of flows and resultant data in the classification process, as well as the use of specialized classifier logic blocks and Content Addressable Memory (CAM) to perform the classification efficiently. Therefore, the details of classification will not be discussed further.

The resultant data also indicates whether or not the RTP packet 1420 is to be transcoded, which DSP will perform transcoding, and the return endpoint after transcoding. As described earlier in connection with FIG. 14A, the ingress nP 1325A removes the layer-2 Ethernet header 1410A from the RTP packet 1410, and uses the resultant data to add a non-Ethernet header 1420A'. The header 1420A' contains a layer-1 destination identifier field, an internal destination identifier field, and a return MAC address field.

The layer-1 destination identifier is present because the next hop is a layer-i switch, and the layer-1 switch uses this identifier to deliver the packet to the first destination (on the other side of the switch). As can be seen in FIGS. 14A and 14B, that first destination is conversion logic 1430, so when building header 1420A', the layer-1 destination identifier is that of conversion logic 1430.

The internal destination identifier is present because the intermediate destination, after conversion logic 1430, is one of DSP elements 1330. The internal destination identifier tells conversion logic 1430 which DSP to route the packet to. When building header 1420A', ingress nP 1325A chooses this DSP based on the flow tuple.

The combination of the layer-1 destination identifier field and the internal destination identifier field in header 1420A' is sufficient to deliver the packet to a DSP element 1330 for transcoding. The return MAC address field identifies the egress nP for the return trip.

After adding non-Ethernet header 1420A', ingress nP 1325A forwards the RTP packet 1420 on to switch fabric 1350, which segments the packet 1420 into smaller units or cells. Each cell contains the internal destination identifier, which the switch fabric 1350 uses to deliver the cell to its destination (in this case, conversion logic 1430). On delivery, the switch fabric 1350 reassembles the cells into RTP packet 1420.

Switch fabric 1350 is unaffected by the use of the non-Ethernet header 1420A', because switch fabric 1350 switches on the layer-1 identifier 1420 and ignores layer-2. Thus, packet 1420 passes through switch fabric 1350 transparently. However, packet 1420 is not delivered to layer-2 switch 1360 since this switch expects packets with Ethernet headers. Instead, switch fabric 1350 delivers packet 1420 to conversion logic 1430, which performs further processing before delivery to layer-2 switch 1360.

Conversion logic 1430 removes non-Ethernet header 1420A' and uses the information inside to build an appropriate layer-2 Ethernet header 1440A. Specifically, the return MAC address is copied to the source address in the layer-2 header 1440A, and the DSP identifier is mapped to the corresponding DSP MAC address, which is stored into the destination address of the layer-2 header 1440A. As explained above, this return MAC address is stored in the packet for use in the return path, to identify the egress nP. Storing the return MAC address in the source address field of layer-2 header 1440A has an additional purpose: layer-2 switch 1360 should see that the forward path packet (1440) originated from the egress nP in order to properly switch the returning packet onto the port coupled to the egress nP, using only on the layer-2 header.

The layer-2 switch 1360 then delivers the packet 1440 to DSP 1335A by switching on the layer-2 destination address. Importantly, layer-2 switch 1360 ignores the source address in the layer-2 header, which does not reflect the actual source of the packet. After receiving packet 1440 from the layer-2 switch 1360, the DSP 1335A uses the layer-3 and layer-4 headers 1450B,C to obtain the correct channel context, such as the codec type of the RTP payload in the incoming packet 1440, and the desired codec type for the outgoing packet 1450. In one embodiment, transcoding is performed in stages: a first DSP 1335A converts from the incoming codec format to a PCM stream; the PCM stream is delivered over a time-division-multiplexed (TDM) bus to a second DSP 1335A; the second DSP 1335A converts from the PCM stream to the desired codec format, storing the transcoded RTP payload in egress packet 1450.

Since the transcoding operation can change the RTP payload size, the DSP 1335A updates the length and checksum fields in layer-3 and layer-4 headers 1450B,C after transcoding, but the L3 and L4 addressing information is not modified. To direct the egress packet 1450 back to the egress nP 1325B, the DSP 1335A uses the destination and source address from the layer-2 header 1440A of the incoming packet, but swaps the addresses. The result is a layer-2 source address of DSP 1335A and a layer-2 destination address of egress nP 1325B (originally carried from egress nP 1325B in a return MAC address field of non-Ethernet header 1420A').

Egress packet 1450 is then forwarded to the layer-2 switch 1360, which delivers the packet 1450 by switching on the destination address in the layer-2 header 1450A. Importantly, the layer-2 switch 1360 is programmed to deliver packets destined for any nP 1325 to the conversion logic 1430. That is, the conversion logic 1430 appears to the layer-2 switch 1360 to have multiple MAC addresses.

Conversion logic 1430 strips the layer-2 header 1450A, using the information in the layer-2 header 1450A to build an appropriate non-Ethernet header 1460A. Note that non-Ethernet header 1460A is the same header type as non-Ethernet header 1420A'. Operating at layer-1, switch fabric 1350 ignores the source address in the layer-2 header (which does not reflect the actual source of the packet.

Egress nP 1325B receives the egress packet 1460 from the switch fabric 1350. The egress nP 1325B extracts the flow tuple or flow identifier from the layer-3 and layer-4 headers 1460B, C and uses the flow as a key to look up resultant data. The resultant data indicates the appropriate layer-2 destination address (which is outside of the network device 1400). The layer-2 header 1470A is updated, using the external address from the resultant data as destination, and the MAC address of the egress nP 1325B as source. Finally, the egress nP 1325B transmits the egress packet 1470, which exits the network device 1400.

Figure 15:
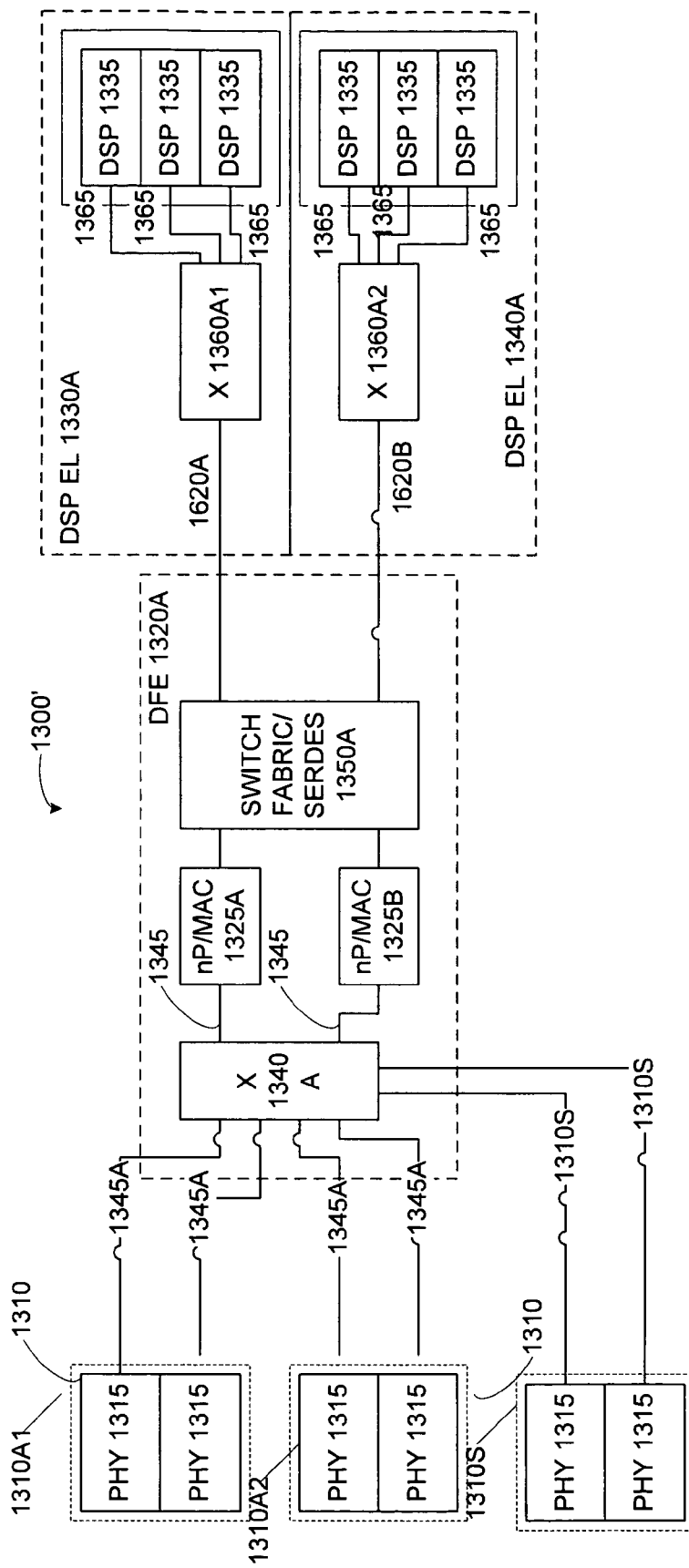
FIG. 15 is a hardware block diagram showing an embodiment of a network device that includes PHY card redundancy.
Figure 16:
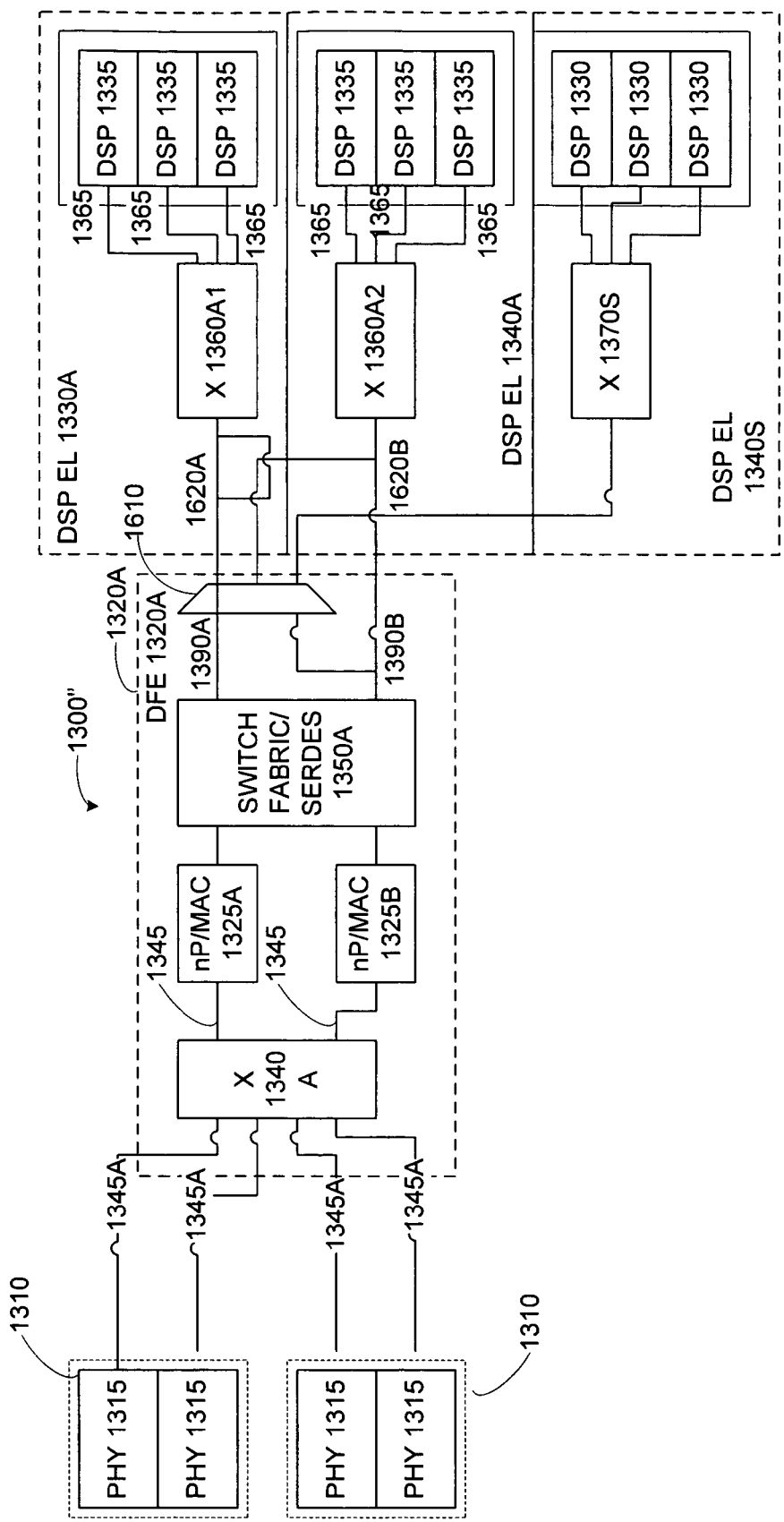
FIG. 16 is a hardware block diagram showing an embodiment of a network device with DSP element redundancy.
Figure 17:
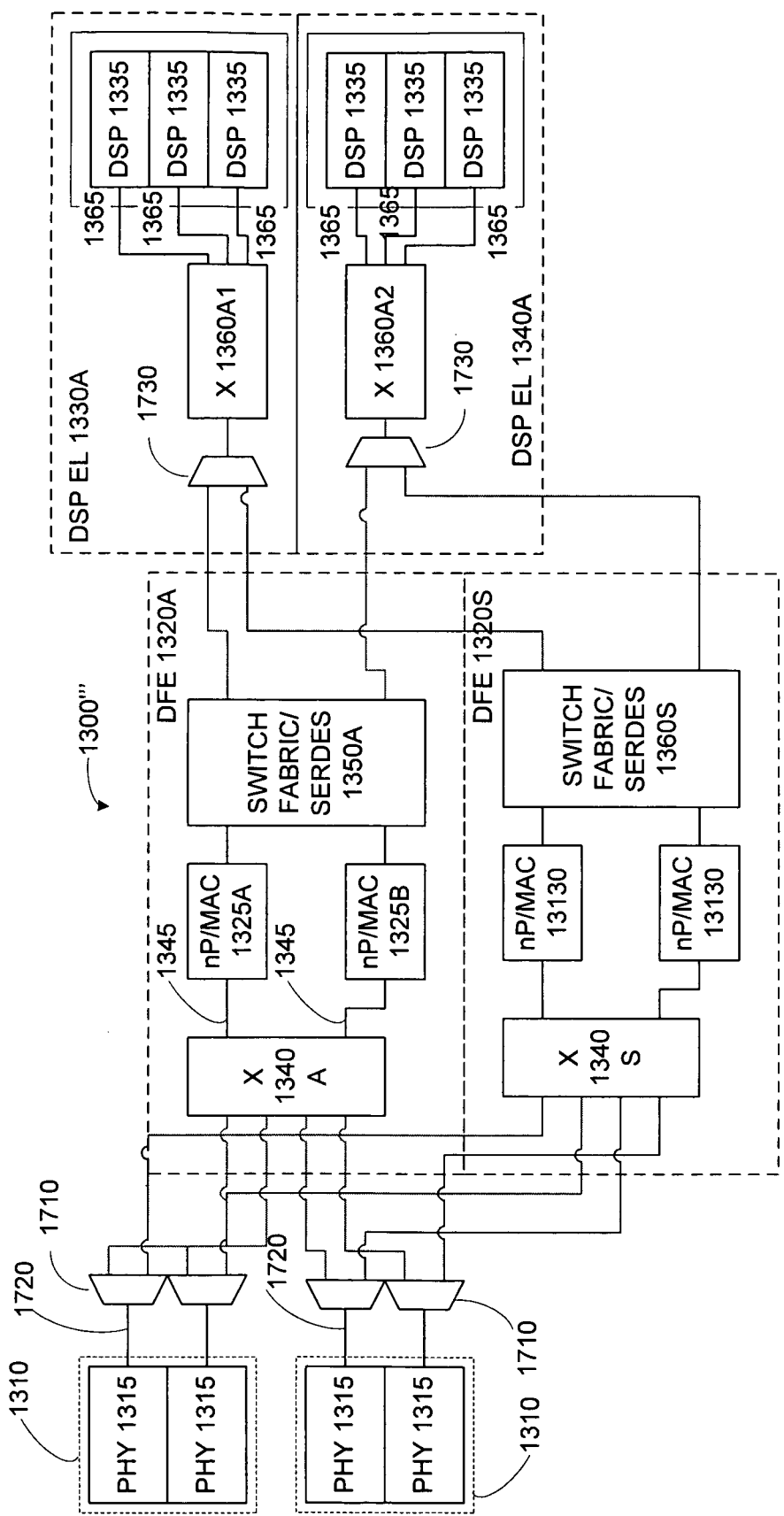
FIG. 17 is a hardware block diagram showing an embodiment of a network device with data forwarding element (DFE) redundancy.

Additional inventive forms of redundancy in the data plane are shown in FIGS. 15-17. FIG. 15 is a hardware block diagram showing an embodiment of a network device 1300' that includes PHY card redundancy. This embodiment includes only one data forwarding element (DFE) 1320, in order to simplify the explanation of PHY card redundancy. The same principles used to achieve PHY card redundancy discussed here are also applicable when other numbers of DFEs and DSP elements are used.

To implement redundancy, the PHY cards 1310 are divided into groups. At any given time, one group of PHY card(s) (1310A) is active, while the remaining PHY card(s) (1310S) are on standby. At start-up, the layer-2 switch 1340 is programmed so that the links 1345A, which connect the network processors 1325 to the active PHY cards 1310A, are active. The layer-2 switch 1340 is further programmed so that the links 1345S, which connect the DFE 1320 to the standby PHY cards 1310S, are inactive.

One of the standby PHY cards 1310S can become active in a process known as PHY switchover. This embodiment allows a PHY switchover to be efficiently implemented by reconfiguring the active switch links 1345A to be inactive, and reconfiguring the inactive switch links 1345S to be active. Thus, before a PHY card switchover, a data path exists between the individual PHYs 1315 on PHY card 1310A1 and network processor 1325A. Another data path exists between the PHYs 1315 on PHY card 1310A2 and network processor 1325B. A failure of PHY card 1310A2 would lead to a switchover to PHY card 1310S, so that the data path becomes: PHYs on PHY card 1310A1 to network processor 1325A; PHYs on PHY card 1310S to network processor 1325B.

FIG. 16 is a hardware block diagram showing yet another embodiment of a network device 1300", this one with DSP element redundancy. This embodiment includes only one data forwarding element (DFE) 1320, in order to simplify the explanation of DSP redundancy.

DSP elements 1330 are divided into two groups. At any given time, the DSP elements in one group (1330A) are active, while those in the other group (1330S) are on standby. An individual DSP 1335, residing on one of the DSP elements in the active group (1330A), receives data packets from the DFE 1320 via the layer-2 switch 1360 associated with that DSP element 1330A. After performing DSP operations on the packets, the individual DSP 1335 forwards the data packets, through the layer-2 switch 1360, back to the DFE 1320.

DSP redundancy results in more DSP elements 1330 than ingress paths, so a multiplexer 1610 is connected between the switch fabric 1350 and the switches 1360 associated with the DSP elements 1330. Since there are 2 ingress paths and 3 DSP elements, a 2:3 multiplexer is used to select one of the 3 possible outputs for connection to each of the 2 inputs. Specifically, the multiplexer 1610 is programmed to connect each ingress path from a network processor 1325 to the two layer-2 switches (1360A) that are associated with the active DSP elements 1330A. This multiplexer 1610 does not provide a connection through to the layer-2 switch (1360S) that is associated with the inactive DSP element 1330S.

One of the standby DSP elements 1330S can become active in a process known as DSP switchover. This embodiment allows a DSP switchover to be efficiently implemented by reconfiguring the multiplexer 1610 to select outputs which lead to different DSP elements 1330. An example reconfiguration, as applied to FIG. 16, is as follows.

In the initial configuration, DSP elements 1330A1 and 1330A2 are active, and DSP element 1330S is on standby. The initial configuration of the multiplexer 1610 connects one ingress path 1620A, from network processor 1325A, to switch 1360A1 (associated with the active DSP element 1330A1). The multiplexer 1610 is connects the other ingress path 1620B, from network processor 1325B, to switch 1360A2 (associated with the active DSP element 1330A2). In this initial configuration, active DSP elements 1330A1 and 1330A2 receive data packets from DFE 1320A, while standby DSPE 930S is not connected to the data path.

To perform a DSP switchover from active DSP element 1330A1 to standby DSP element 1330S, the multiplexer 1610 is re-programmed to connect the ingress path 1620A (from network processor 1325A) to switch 1360S, instead of connecting to the switch 1360A1. Since the second active DSP element (1330A2) remains active, the second ingress path 1620B remains unchanged, and connected to the switch 1360A2. In this post-switchover configuration, the now-active DSP elements 1330S and 1330A2 receive data packets from DFE 1320A (via 1360A), while formerly-active DSPE 930A1 is not connected to the data path.

FIG. 17 is a hardware block diagram showing yet another embodiment of a network device 1300''', this one with data forwarding element (DFE) redundancy. At any particular time, exactly one DFE is active (1320A) and the remaining data forwarding element(s) (1320S) are on standby. Since each DFE 1320 communicates with PHY cards 1310 and with DSP elements 1330, both of these communication paths must be switched when the standby DFE assumes the role of active DFE.

DFE redundancy results in more DFEs 1320 than ingress paths through the PHYs, so a series of multiplexers 1710 is connected between the PHYs 1315 and the switches 1340 associated with the DFEs 1320. The multiplexers 1710 are programmed to connect one ingress path from an individual PHY 1315 to the layer-2 switch (1340A) associated with the active DFE 1320A. Importantly, the multiplexers 1710 do not provide connections through to the layer-2 switch (1340S) associated with the standby DFE 1320S.

A DFE switchover can be implemented by reconfiguring the multiplexers 1710 to select outputs leading to different DFEs 1320. An example reconfiguration, as applied to FIG. 17, is as follows.

In the initial configuration, DFE 1320A is active, and DFE 1320S is on standby. The initial configuration of multiplexers 1710 connects ingress paths 1720, from PHYs 1315, to layer-2 switch 1340A (associated with the active DFE 1320A). In this configuration, now-active DFE 1320A receives data packets from PHYs 1315, while standby DFE 1320S is not connected to the data path.

To perform a DFE switchover from active DFE 1320A to standby DFE 1320S, the multiplexers 1710 are re-programmed to connect the ingress paths 1720 (from PHYs 1315) to layer-2 switch 1340S, instead of connecting to switch 1340A. In this post-switchover configuration, active DFE 920S receives data packets from PHYs 1315 (via switch 1340S), while formerly active DFE 1320A is not connected to the data path.

On the DSP side of the data forwarding plane 1305, a DFE switchover can be implemented using a second series of multiplexers 1730. Each of these multiplexers 1730 is connected between the fabric 1350 and one of the switches (1360) associated with a DSP element 1330. Each multiplexer 1710 is programmed to connect one path (1740) between a DSP element 1330 and the switch fabric (1350A) that is associated with the active DFE 1320A. The multiplexers 1730 do not provide connections through to the switch fabric (1350S) associated with the standby DFE 1320S.

To perform a DFE switchover from active DFE 1320A to standby DFE 1320S, the multiplexers 1730 are re-programmed to connect the paths 1740A, B, (from DSP elements 1330) to fabric 1350A, instead of connecting to fabric 1350S. In this post-switchover configuration, now-active DFE 1320S has a data path to DSPs 1335 (via switch 1360S), while formerly-active DFE 1320A is not connected to the data path.

The configuration described above allows communication paths to the DFEs 1320 to be easily and seamlessly reconfigured during a DFE switchover. In some prior art systems, a PHY card 1310 is tied to a particular DFE 1320. In such a system, switching to a standby DFE 1320 would also require switching to another PHY card 1310, or set of PHY cards. In contrast, this inventive aspect of data plane redundancy includes a path between each DFE 1320 and every PHY card 1310, and the paths can be activated and deactivated. Thus, a DFE switchover does not require using different PHY cards 1310. Similarly, a path exists between each DFE 1320 and every DSP element 1330, and the paths can be activated and deactivated, so that a DFE switchover does not require using different DSP elements 1330.

Figure 18:
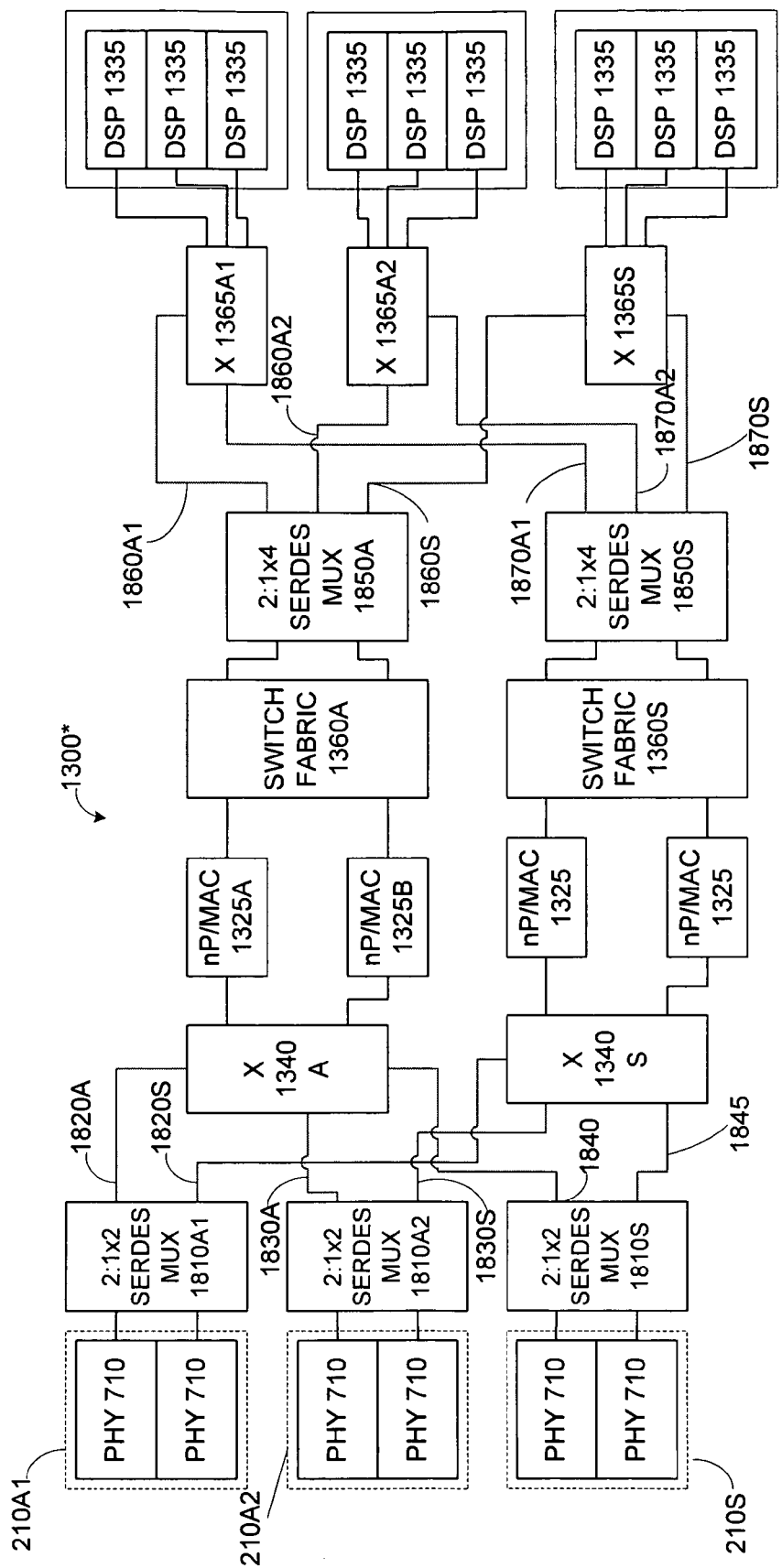
FIG. 18 is a hardware block diagram showing an embodiment of a network device which combines DFE, DSP and PHY redundancy.

FIG. 18 is a hardware block diagram showing yet another embodiment of a network device 1300* which combines DFE, DSP and PHY redundancy, using two sets of multiplexers. These multiplexers also include SERDES functionality. On the PHY side, a first SERDES multiplexer 1810A1 converts two input streams from active PHY card 1310A1 into a single serialized stream (not shown) then connects that serialized stream to one of two outputs: output 1820A connects to switch 1340A, which is linked to the active DFE 1320A; output 1820S connects to the switch 1340S, which is linked to the inactive DFE 1320S.

In a similar manner, another SERDES multiplexer 1810A2 converts two input streams from active PHY card 1310A2 into a single serialized stream, then connects that serialized stream to either output 1830A (connected to active DFE switch 1340A) or output 1830S (connected to the inactive DFE switch 1340S).

At start-up, the two SERDES multiplexers 1810 are programmed to connect to the active DFE switch 1340A, so that the data path includes active PHY cards 1310A1 and 1310A2, as well as active DFE switch 1340A. In a DFE switchover, the PHY side connections are redirected by reprogramming the multiplexers 1810A1 and 1810A2 to connect to the inactive DFE switch 1340S instead of the active DFE switch 1340A.

This embodiment also includes inactive PHY card 1310S. Links 1820A and 1830A couple the active DFE switch 1340A to the active PHY multiplexers 1810A1 and 1810A2. The active DFE switch 1340A also has a link (1840) to the standby PHY multiplexer 1810S. Similarly, the standby DFE switch 1340S is coupled, through links 1820S and 1830S to the active PHY multiplexers 1810A1 and 1810A2, and through link 1850 to the standby PHY multiplexer 1810S.

At start-up, active DFE switch 1340A is programmed so that links 1820A and 1830 to the active PHY multiplexers 1810A1 and 1810A2 are active, while link 1840 to the inactive PHY multiplexer 1810S is inactive. A PHY switchover from PHY card 1310A1 to PHY card 1310S is efficiently implemented by reprogramming the active DFE switch 1340A so that the link 1840 to the PHY multiplexer 1810S is activated. The active DFE switch 1340A is further reprogrammed so that link 1820A to the PHY multiplexer 1810A1 is deactivated.

Additional SERDES multiplexers 1860 are used on the DSP side to provide both DSP and DFE redundancy. Multiplexer 1860A provides DSP redundancy by combining two input streams into a single serialized stream (not shown). The serialized stream is then connected to two of three outputs: output 1870A1 connects to switch 1360A1, which is linked to the one of the active DSP elements (1330A1); output 1870A1 connects to the switch 1360A2, which is linked to another active DSP element (1330A2); and output 1870S connects to switch 1360S, which is linked to the inactive DSP element 1330S. In a DSP switchover from active DSP element 1330A to standby DSP element 1330S, the multiplexer 1860 to is reprogrammed so that the serialized stream is connected to the now-active DSP element 1330S instead of the formerly-active DSP element 1330S.

Yet another SERDES multiplexer 1860S converts two input streams from the inactive switch fabric 1350S into a single serialized stream (not shown). The serialized stream is then connected to two of three outputs: output 1880A connects to switch 1360A1, which is linked to the one of the active DSP elements (1330A1); output 1880A1 connects to the switch 1360A2, which is linked to another active DSP element (1330A2); and output 1880S connects to switch 1360S, which is linked to the inactive DSP element 1330S.

In this configuration, each DSP switch 1360 has a link (1870) to the multiplexer (1860A) associated with the active DFE. Each DSP switch 1360 also has a link (1880) to the multiplexer (1860S) associated with the standby DFE (1320S). At start-up, each DSP switch 1360 is programmed so that links 1870 to the active DFE multiplexer 1860A are active, while links 1880 to the inactive DFE multiplexer 1860S are inactive. On the DSP side, a DFE switchover is efficiently implemented by reprogramming the active DSP switches 1360A1 and 1360A2 so that the links 1870 become active, while links 1880 become inactive.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved. The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM). The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to illustrate the principles of the invention and its practical application to thereby enable one of ordinary skill in the art to utilize the invention in various embodiments and with various modifications as are suited to the particular use contemplated. All such modifications and variation are within the scope of the invention as determined by the appended claims when interpreted in accordance with the breadth to which they are fairly and legally entitled.

What we claim is:

1. A method for processing a signaling message, the method comprising the steps of:
   receiving a definition of a first transcoding policy associated with a first endpoint;
   receiving a definition of a second transcoding policy associated with a second endpoint, wherein the definition of the first transcoding policy and the definition of the second transcoding policy are user configurable and each specifies at least one rule for processing a codec list contained with the signaling message;
   determining whether the first transcoding policy applies to a received first call offer containing an originator endpoint and an answerer endpoint;
   determining whether the second transcoding policy applies to the first call offer;
   responsive to the first transcoding policy being applicable, applying the first transcoding policy to a first offer codec set in the first call offer to produce a second call offer containing a second offer codec set;
   responsive to the second transcoding policy being applicable, applying the second transcoding policy to the second codec set to produce a third call offer containing a third offer codec set;
   comparing a first answerer codec set in a received first answer and a second answerer codec set contained in the second call offer; and
   determining whether to perform transcoding based on a result of the comparison.

2. The method of claim 1, further comprising the step of:
   generating a second answer with contents based on result of the comparison.

3. The method of claim 1, further comprising the steps of:
   receiving the first call offer indicating the originator endpoint and the answerer endpoint;
   sending the third call offer to the answerer endpoint;
   receiving the first answer to the third call offer; and
   sending the second answer to the originator endpoint.

4. The method of claim 1, wherein the applying the first transcoding policy step further comprises the step of:
   parsing the first transcoding policy to determine a codec that is allowed by the first transcoding policy;
   parsing the first offer codec set to determine whether the allowed codec is present; and
   copying the allowed codec, if present, to the first offer codec set.

5. The method of claim 1, wherein the applying the first transcoding policy step further comprises the step of:
   parsing the first transcoding policy to determine a codec that is disallowed by the first transcoding policy;
   parsing the first offer codec set to determine whether the disallowed codec is present; and
   removing the disallowed codec, if present, from the first offer codec set.

6. The method of claim 1, wherein the applying the first transcoding policy step further comprises the step of:
   parsing the first transcoding policy to determine one or more codecs that are forced by the first transcoding policy;
   parsing the first offer codec set to determine whether the forced codecs are present; and
   if the forced codec is present, removing any codecs other than the forced codecs from the first offer codec set.

7. The method of claim 1, wherein the applying the first transcoding policy step further comprises the steps of:
   parsing the first transcoding policy to determine a codec that is added by the first transcoding policy; and
   adding the added codec to the first offer codec set.

8. A system for processing a signaling message, the system comprising:
   means for receiving a definition of a first transcoding policy associated with a first endpoint;
   means for receiving a definition of a second transcoding policy associated with a second endpoint, wherein the definition of the first transcoding policy and the definition of the second transcoding policy are user configurable and each specifies at least one rule for processing a codec list contained with the signaling message;
   means for determining whether the first transcoding policy applies to a received first call offer containing an originator endpoint and an answerer endpoint;
   means for determining whether the second transcoding policy applies to the first call offer;
   means for applying the first transcoding policy, responsive to the first transcoding policy being applicable, to a first offer codec set in the first call offer to produce a second call offer containing a second offer codec set;
   means for applying the second transcoding policy, responsive to the second transcoding policy being applicable, to the second codec set to produce a third call offer containing a third offer codec set;
   means for generating a second answer based on a comparison of a first answerer codec set in a received first answer and a second answerer codec set contained in the second call offer; and
   means for determining whether to perform transcoding based on the comparison.

9. The system of claim 8, further comprising:
   means for receiving the first call offer indicating the originator endpoint and the answerer endpoint;
   means for sending the third call offer to the answerer endpoint;
   means for receiving the first answer to the third call offer; and
   means for sending the second answer to the originator endpoint.

10. The system of claim 8, wherein the means for applying the first transcoding policy further comprises:
   means for parsing the first transcoding policy to determine a codec that is allowed by the first transcoding policy;
   means for parsing the first offer codec set to determine whether the allowed codec is present; and
   means for copying the allowed codec, if present, to the first offer codec set.

11. The system of claim 8, wherein the means for applying the first transcoding policy further comprises:
   means for parsing the first transcoding policy to determine a codec that is disallowed by the first transcoding policy;
   means for parsing the first offer codec set to determine whether the disallowed codec is present; and
   means for removing the disallowed codec, if present, from the first offer codec set.

12. The system of claim 8, wherein the means for applying the first transcoding policy further comprises:
   means for parsing the first transcoding policy to determine one or more codecs that are forced by the first transcoding policy;
   means for parsing the first offer codec set to determine whether the forced codecs are present; and
   means for removing, if the forced codec is present, any codecs other than the forced codecs from the first offer codec set.

13. The system of claim 8, wherein the means for applying the first transcoding policy further comprises:
   means for adding a new codec to the first offer codec set as indicated by the first transcoding policy.

* * * * *